United States Patent
Harris

(10) Patent No.: US 7,707,462 B1
(45) Date of Patent: Apr. 27, 2010

(54) NON-DISRUPTIVE GENERATION OF CORE FILES WITHOUT REBOOT

(75) Inventor: Michael D. Harris, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 452 days.

(21) Appl. No.: 11/789,185

(22) Filed: Apr. 24, 2007

(51) Int. Cl.
*G06F 11/00* (2006.01)

(52) U.S. Cl. .......................... 714/47; 714/45

(58) Field of Classification Search ............ 714/45, 714/47
See application file for complete search history.

(56) References Cited

U.S. PATENT DOCUMENTS

| | | | | |
|---|---|---|---|---|
| 6,145,100 A | * | 11/2000 | Madduri | 714/45 |
| 6,167,536 A | * | 12/2000 | Mann | 714/45 |
| 6,813,731 B2 | * | 11/2004 | Zahavi et al. | 714/45 |
| 7,055,070 B1 | * | 5/2006 | Uhler et al. | 714/45 |
| 2006/0074970 A1 | * | 4/2006 | Narayanan et al. | 707/102 |

* cited by examiner

*Primary Examiner*—Robert Beausoliel
*Assistant Examiner*—Charles Ehne
(74) *Attorney, Agent, or Firm*—Suiter Swantz pc llo

(57) ABSTRACT

The present invention is directed to non-disruptive generation of core files for a computer appliance without rebooting the computer appliance. In an embodiment of the invention, the computer appliance is analyzed. A determination is made as to what core file generation options will be non-disruptive to the computer appliance. The tradeoff is evaluated between options that will generate core files which are more useful in diagnosing potential problems with the computer appliance and options which will generate core files which are less disruptive. A procedure is determined which will generate the core file without disrupting the computer appliance. Resources are allocated to utilize in generation of the core file. The procedure is then executed and a core file is generated without disrupting the computer appliance.

19 Claims, 16 Drawing Sheets

NON-DISRUPTIVE GENERATION OF CORE FILES WITHOUT REBOOT

FIELD OF THE INVENTION

The present invention generally relates to the field of core file generation, and more particularly to non-disruptive generation of core files without reboot for computer appliances.

BACKGROUND OF THE INVENTION

Computer appliances are devices with one or a few specific functions and limited ability to configure. A computer appliance may be an embedded system (a special-purpose system in which the computer is completely encapsulated by the device it controls). A router is an example of a computer appliance which forwards data packets across a network toward their destinations, through a process known as routing. A Network-Attached Storage (NAS) device is an example of a computer appliance which connects to a computer network to provide centralized data access and storage to a diverse range of differing network clients. A Storage Area Network (SAN) device is an example of a computer appliance which allows connection to remote targets such as disks and tape drives on a network for block level I/O. Core files (a recorded state of working memory at a specific time) may be generated to aid in diagnosing potential problems with a computer appliance.

Traditionally, generation of core files was very disruptive to a computer appliance. The computer appliance was halted so that resources could be seized for core file generation. The contents of memory were then processed (to determine which areas of memory belonged to the system and needed to be recorded and which areas were user data and did not need to be recorded), recorded, and (optionally) compressed to generate a useable core file. Core file generation generally required more resources than the computer appliance could spare without disruption and reboot of the computer appliance was required subsequent to core file generation to restore normal operation. Because of this disruption and subsequent requirement to reboot the computer appliance, core files are often not generated when needed if the operation of the computer appliance is deemed more important than generation of a core file. Even if a core file is generated, the core file may be generated when less critical activities are taking place. This may reduce the value of the core file for purposes of diagnosing potential problems with the computer appliance that occur during more critical activities. As a result, the desire to keep the computer appliance running may interfere with diagnosis of potential problems with the computer appliance.

Consequently, it would be desirable to non-disruptively generate core files without reboot in order to diagnose potential problems with a computer appliance.

SUMMARY OF THE INVENTION

Accordingly, the present invention is directed to non-disruptive generation of core files for a computer appliance without reboot. In an embodiment of the invention, the state of the computer appliance is analyzed. A determination is made, based upon the analysis, as to which core file generation options will be non-disruptive to the computer appliance. These options may include: generation of a synchronous core file or an asynchronous core file, generation of the core file to memory or to disk, analyzing memory to select portions to include in the core file and portions to not include in the core file, analyzing the core file to select and remove portions of the core file, and compressing the core file. The tradeoff is evaluated between options that will generate core files which are more useful in diagnosing potential problems with the computer appliance and options which will generate core files which are less disruptive. A procedure is determined, based upon the determined options, which will generate the core file without disrupting the computer appliance. Resources are allocated to utilize in generation of the core file. By allocating resources for core file generation prior to core file generation, the core file is able to be generated by normally utilizing the resources of the computer appliance rather than seizing resources to generate the core file. The procedure is then executed and a core file is generated without disrupting the computer appliance.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
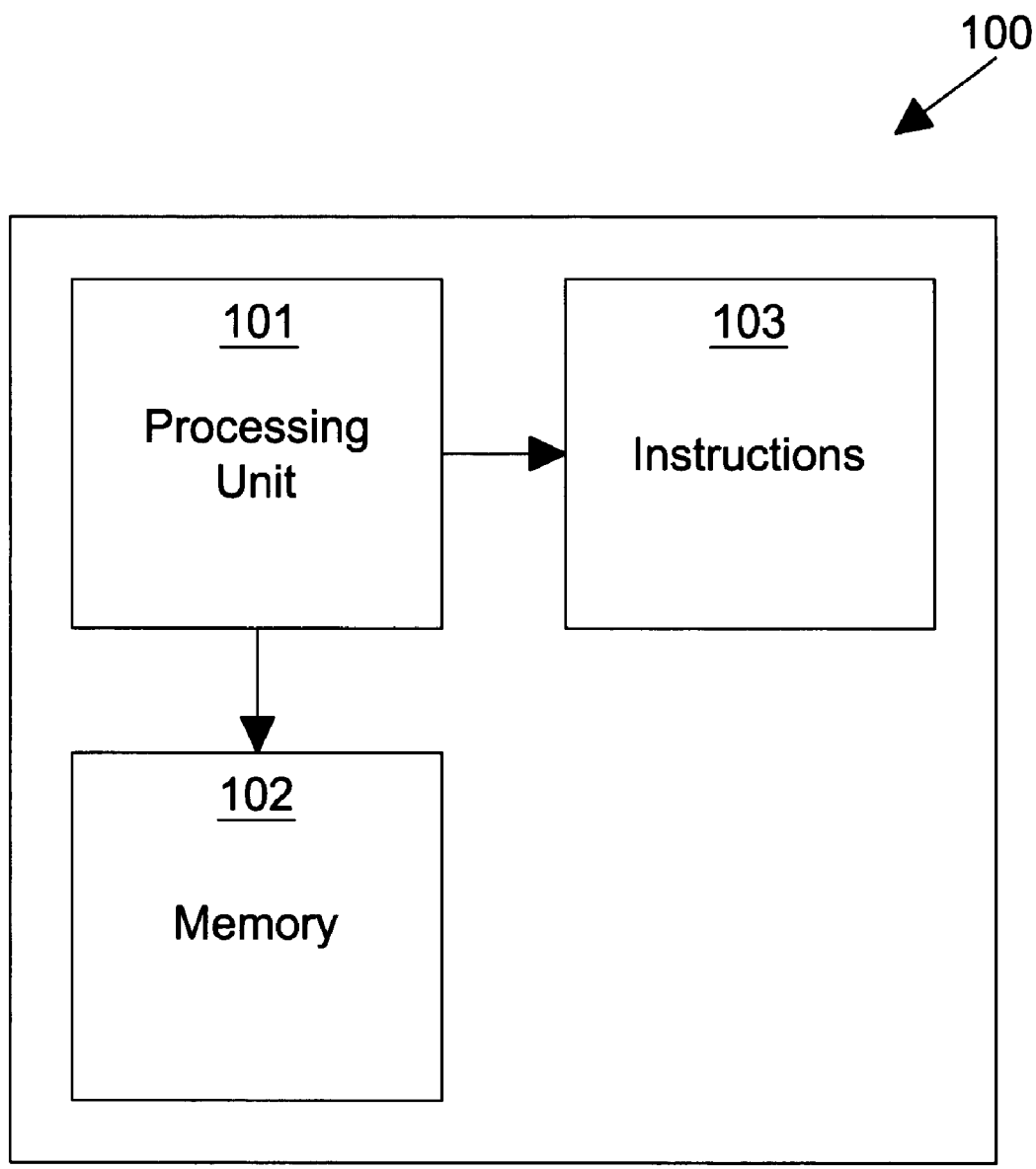
FIG. 1 is a block diagram illustrating a computer appliance, in accordance with an exemplary embodiment of the present invention.

Referring generally to FIG. 1, a computer appliance 100, in accordance with an exemplary embodiment of the present invention, is illustrated. The computer appliance 100 includes a processing unit 101, memory 102 coupled to the processing unit 101, and instructions 103 for generating a core file embodied in a tangible medium and executable by the processing unit 101. The instructions 103 may be embodied in memory, which may be read by the processing unit 101. The instructions 103 may be embodied on a disk, which the processing unit 101 may instruct to be read into the memory. The instructions 103 may be embodied in a ROM (read only memory) chip, which is readable by the processing unit 101. A core file is a recording of the working state of memory 102 at a specific time. When the instructions 103 are executed by the processing unit 101, a core file is generated without disrupting the computer appliance 100 and without rebooting the computer appliance 100. Without disruption means that there is no significant impact on any users of the computer appliance 100 and the computer appliance 100 can resume normal operation after generation of the core file.

The computer appliance 100 may comprise a Network-Attached Storage device produced by Network Appliance, Inc. and may run the Data ONTAP® storage operating system. The instructions 103 may comprise a command for generating a core file. The instructions 103, when executed by the processing unit, may automatically generate a support collateral (information related to the computer appliance 100 used to support diagnosis of potential problems). The instructions 103, when executed by the processing unit, may cause the core file to be generated after a delay such that the instructions have finished executing before the core file is generated. Although the present invention is described in the context of the Data ONTAP® storage operating system, a person of ordinary skill in the art would understand that any operating system can be utilized without departing from the scope of the present invention.

In generating the core file, the processing unit may analyze the current state of the computer appliance 100. The processing unit may analyze the current state of the computer appliance 100 by examining available memory, examining available memory buffers, examining availability and usage of storage devices, examining process queues and processor usage, polling subsystems, and the like. Based on the analysis, the processing unit 101 may determine how the core file may be generated without disrupting the computer appliance 100. The processing unit 101 may allocate resources to utilize in generation of the core file and may then generate the core file without disrupting the computer appliance. Resources may include processing unit 101 resources. Resources may include worker threads to generate the core file. Resources may include memory or disk space to which the core file may be generated. Memory resources may include RAM (random access memory), flash memory, and removable memory devices such as USB (universal serial bus) memory devices and PCMCIA (Peripheral Component MicroChannel Interconnect Architecture) memory devices. Resources may include disk I/O (input/output) throughput. By allocating resources for core file generation prior to core file generation, the processing unit 101 is able to generate the core file by normally utilizing the resources of the computer appliance 100 rather than seizing the resources of the computer appliance 100 to generate a core file.

The processing unit 101 may determine, based upon the analysis of the current state of computer appliance 100 and available resources, what core file generation options will not disrupt the computer appliance. The processing unit 101 may evaluate the tradeoff in core file generation options between options that will generate core files which are more useful in diagnosing potential problems with the computer appliance 100 and options which will generate core files which are less disruptive to the computer appliance 100. The core file generation options include, but are not limited to, generation of a synchronous core file or an asynchronous core file, generation of the core file to memory or to disk, analyzing memory 102 to select portions to include in the core file and portions to not include in the core file, analyzing the core file to select and remove portions of the core file, and compressing the core file. If the processing unit 101 is being heavily utilized, the processing unit 101 may determine not to analyze memory 102 to select portions to include in the core file and portions to not include in the core file to avoid consuming resources of processing unit 101. If the processing unit 101 is not being heavily utilized and the disk is heavily utilized, the processing unit 101 may determine to analyze memory 102 to select portions to include in the core file and to not include in the core file, generating a smaller core file requiring less disk I/O throughput resources. If the processing unit 101 is heavily utilized and memory is available to generate the core file, the processing unit 101 may determine to generate the core file to memory rather than to disk to avoid wasting time waiting for data to be written to disk. If memory is available and disk space is unavailable, the processing unit 101 may determine that the core file should be generated to memory rather than to disk. If memory is unavailable and disk space is available, the processing unit 101 may determine the core file should be generated to disk. If different memory devices are available and one is heavily utilized and the other is not, the processing unit 101 may determine to generate the core file to the memory device which is not heavily utilized to avoid disrupting the heavily utilized memory device.

The core file, which is generated when the instructions 103 are executed by the processing unit 101, may be a synchronous or an asynchronous core file. The core file is a synchronous core file when generation of the core file preempts the processes running on the computer appliance 100, only allowing the processes to run which are necessary to the generation of the core file. The core file is an asynchronous core file when generation of the core file allows the processes running on the computer appliance 100 to run normally (without freezing the processes running on the computer appliance 100), generating the core file as resources become available. A synchronous core file more accurately depicts the state of the computer appliance 100 at the time of the decision to generate a core file than an asynchronous core file, because it prevents non-essential processes from running and altering the state of the computer appliance 100 before the core file is generated. However, because generation of a synchronous core file preempts the processes running on the computer appliance 100, it can be more disruptive to the computer appliance 100 than an asynchronous core file. An asynchronous core file is less disruptive because it allows processes on the computer appliance 100 to run normally, but it less accurately depicts the state of the computer appliance 100 at the time of the decision to generate a core file because it allows processes running on the computer appliance 100 to alter the state of the computer appliance 100.

The core file may be generated to memory. The memory, which the core file is generated to, may include, but is not limited to, static or dynamic RAM, flash memory, or a removable memory device such as a USB memory device or a PCMCIA memory device. Alternatively, the core file may be generated to disk. Generating the core file to disk is more disruptive to the computer appliance 100 than generating the core file to memory because writing to disk requires much more I/O time than writing to memory. However, if memory is not available to generate the core file to, it may be necessary to generate the core file to disk.

The processing unit 101 may analyze memory 102 prior to generation of the core file. Based upon the memory analysis, the processing unit 101 may select one or more portions of memory 102 to include in the core file and one or more portions of memory 102 to not include in the core file. The processing unit 101 may analyze memory 102 prior to generation of the core file to determine which portions of memory 102 are user data and which portions of memory 102 are not user data. Based upon the memory analysis the processing unit 101 may select the portions of memory 102 which are not user data to include in the core file and select the portions of memory 102 which are user data to not include in the core file. Alternatively, the processing unit 101 may analyze memory 102 prior to generation of the core file to determine which portions of memory 102 relate to one or more subsystems. Based upon the memory analysis the processing unit 101 may select the portions of memory 102 which relate to one or more subsystems to include in the core file and select the portions of memory 102 which do not relate to one or more subsystems to not include in the core file. A subsystem is a functional component of the computer appliance 100. Subsystems may include, but are not limited to, a disk subsystem, a kernel subsystem, Network File System (NFS), Common Internet File System (CIFS), Write Anywhere File Layout (WAFL), and network protocols.

After the core file has been generated, the processing unit 101 may analyze the core file. Based upon the analysis, the processing unit 101 may select and remove one or more portions of the core file. The processing unit 101 may analyze the core file to determine which portions of the core file are user data and which portions of the core file are not user data. Based upon the core file analysis, the processing unit 101 may select and remove the portions of the core file which are user data. Alternatively, the processing unit 101 may analyze the core file to determine which portions of the core file relate to one or more subsystems. Based upon the core file analysis, the processing unit 101 may select and remove the portions of the core file which do not relate to one or more subsystems.

After the core file has been generated, the processing unit 101 may compress the core file. Compression of the core file, particularly when the processing unit 101 has removed portions of the core file, may result in a significantly smaller core file. The core file may be compressed utilizing any compression algorithm without departing from the scope of the present invention including, but not limited to the LZW (Lempel-Ziv_Welch) compression algorithm and the zlib compression algorithm.

Prior art generation of core files is disruptive to a computer appliance due to the time required to generate the core file, failure to prevent the core file generation from disrupting the storage subsystem, failure to prevent the core file generation from disrupting the scheduler, and failure to prevent the core file from disrupting memory. This disruption prevents a computer appliance from being able to resume operation after generation of a core file.

Computer appliance 100 may have an amount of delay it can tolerate without being disrupted. Computer appliance 100 may include subsystems which can tolerate less delay than computer appliance 100 can tolerate. The present invention may generate the core file without disrupting computer appliance 100 by limiting core file generation time to an amount of delay computer appliance 100 can sustain without being disrupted.

The present invention may reduce the time required for generation of the core file by generating the core file to the destination device which has the highest speed of available destination devices. For example, the present invention may generate the core file to memory rather than disk if the core file can be generated to memory faster than to disk. The present invention may create a rank structure which ranks available destination devices by speed and available space. The present invention may then utilize the rank structure to determine the fastest device to utilize for generating the core file which has enough available space to contain the core file. The present invention may also reduce the time required for core file generation by selecting a portion of memory to generate the core file from rather than generating the core file from all of memory. The present invention may construct a memory descriptor array which describes each piece of memory which the core file should be generated from. Reducing the amount of memory a core file is generated from reduces the time required to generate the core file.

When generating a core file to memory, memory may need to be allocated by the computer appliance 100. Memory which to generate the core file to may be allocated as a contiguous block. A contiguous block of memory which is of sufficient size to generate the core file to may not be available. If a contiguous block of sufficient size is available, the computer appliance 100 may not have enough unallocated memory after the allocation to operate. Thus, the computer appliance 100 would be disrupted. Alternatively, memory which to generate the core file to may be allocated in small blocks rather than as one contiguous block. It is more likely that multiple small blocks which aggregate to a sufficient size to generate the core file to can be allocated than one contiguous block, but may still leave less unallocated memory than the computer appliance 100 requires for operation. Thus, the computer appliance 100 would be disrupted. A computer appliance which is a caching device may include cache buffers (an area of the RAM of the computer appliance which is allocated for caching) (not shown in Figures). When a caching device has an operation to perform which the caching device may put data related to the operation into one or more cache buffers and mark the cache buffers as dirty on a list of dirty and clean cache buffers. A "dirty" cache buffer is a cache buffer which contains data which requires further action to complete an operation. A "clean" cache buffer is a cache buffer which does not contain data which requires further action to complete an operation. By placing data related to an operation in a cache buffer and marking the cache buffer dirty, the caching appliance may treat the operation as already completed as the cache buffer will remain marked dirty until the operation is completed. For a computer appliance which is a storage caching device, cache buffers may comprise user data buffers. For a computer appliance which is a protocol switching device, cache buffers may comprise protocol buffers. For a computer appliance which is a storage caching device, when a request to write to the storage system is received, the write may be performed to a clean user data buffer rather than to disk. The write may also be recorded in a non volatile ram. A tog of dirty user data buffers may also be recorded in non volatile ram. This log of dirty user data buffers allows the computer appliance to determine which user data buffers are available for use. The storage caching device may then write the user data buffers to disk and clear the log. In this way, the storage caching device may indicate that the write request has been performed once written to the user data buffer and non volatile ram and logged in non volatile ram even though a write to disk has not been completed. Even if the storage caching device fails prior to outstanding writes in user data buffers being written to disk, the writes and log will be preserved in non volatile ram. For a computer appliance 100 which is a caching device, the present invention may utilize clean cache buffers as a destination device for generation of a core file. This may provide a large, fast destination device for the generation of a core file, enabling generation of a core file to complete within a period of time which will not disrupt computer appliance 100. Utilization of clean cache buffers as a destination device also prevents the computer appliance 100 from being left with less unallocated memory than is required for non-disrupted operation. Further, because cache buffers in a caching device will not contain information desired for the core file, the present invention may select the cache buffers as a portion of memory to not include in the core file.

The present invention may include an synchronous phase (distinct from whether generation of the core file is synchronous or asynchronous) wherein the core file is generated to an interim storage such as memory or cache buffers and an asynchronous phase wherein the core file which has been generated to interim storage is written to a persistent storage device (a device which maintains storage even when turned off) including, but not limited to, one or more disks, a flash memory, and a tape. If the computer appliance 100 is a caching device, when utilizing clean cache buffers as a destination device for generation of core files, the present invention may itself write the cache buffers to persistent as time permits after the synchronous phase. Alternatively, the present invention may utilize the clean cache buffers as a destination device for the generation of the core file and then include the cache buffers on the log of dirty buffers. If the computer appliance is storage caching device the present invention may not record the memory buffers in non volatile ram, preventing disruption of the computer appliance 100 by over utilization of relatively scarce non volatile ram. Thus, the memory buffers would be written to disk by the normal actions of the file system of the computer appliance 100 after the synchronous phase. Alternatively, if the computer appliance is a caching device and memory has been selected by the present invention as a destination device for generation of the core file, the present invention may itself write the core file which has been generated to memory to persistent storage as time permits after the synchronous phase. Alternatively, the present invention may construct a structure detailing the memory locations occupied by the generated core file and instruct the file system to treat the memory locations detailed in the structure as dirty cache buffers. If the computer appliance 100 is storage caching device the present invention may not record the memory locations detailed in the structure in non volatile ram, preventing disruption of the computer appliance 100 by over utilization of relatively scarce non volatile ram. Thus, the memory buffers would be written to persistent storage by the normal actions of the file system of the computer appliance 100 after the synchronous phase.

The present invention may prevent disruption to the storage subsystem by quiescing the storage system so that it is restartable. The present invention may quiesce the storage subsystem by marking the input/output (I/O) queue of the storage subsystem, allowing I/O's prior to the marker to finish, preventing I/O's subsequent to the marker from starting, and restarting I/O's subsequent to the marker after core file generation has completed. Alternatively, the present invention may quiesce the storage subsystem by submitting I/O's to an alternate I/O queue once core file generation has begun, allowing outstanding I/O's to finish, preventing the I/O's on the alternate queue from starting, and restarting I/O's on the alternate queue subsequent to core file generation.

The present invention may prevent disruption to the scheduler by freezing normal scheduling other than necessary interrupt handlers and then restarting normal scheduling after generation of the core file. The present invention may also prevent disruption to the scheduler by generating an asynchronous core file or by interrupting core file generation if core file generation does not complete within a period of time.

Prior art generation of core files may have opportunistically overwritten portions of memory which had already been dumped by using that memory to temporarily buffer or store the contents of non volatile ram or device memory which may have been difficult to access directly or in a responsive enough manner for direct core file generation to disk. This opportunistic overwriting of memory disrupts memory because the contents of memory have now been partially overwritten. The present invention may prevent memory from being disrupted by generating the core file directly from non volatile ram, if the speed of the non volatile ram is suitable, and/or by iteratively copying manageable portions to unused memory buffers and generating the core file from the memory buffers.

The present invention may generate a set of combinations of resources and core file generation options for generating a core file. The present invention may evaluate an estimated time for the generation of a core file utilizing each combination of resources and core file generation options in the set. The present invention may eliminate from the set any combination of resources and core file generation options which have an estimated time which exceeds the amount of delay that the computer appliance 100 can tolerate without being disrupted. The present invention may rank the combinations of resources and core file generation options in the set by their estimated times. The present invention may also rank combinations of resources and core file generation options which generate synchronous core files higher than combinations of resources and core file generation options which generate an asynchronous core file. Thus, the combination of resources and core file generation options with the longest estimated time which generates a synchronous core file would be ranked higher than the combination of resources and core file generation options with the shortest estimated time which generates an asynchronous core file. The present invention then generates a core file utilizing the combination or resources and core file generation options in the set which is ranked the highest.

Figure 2:
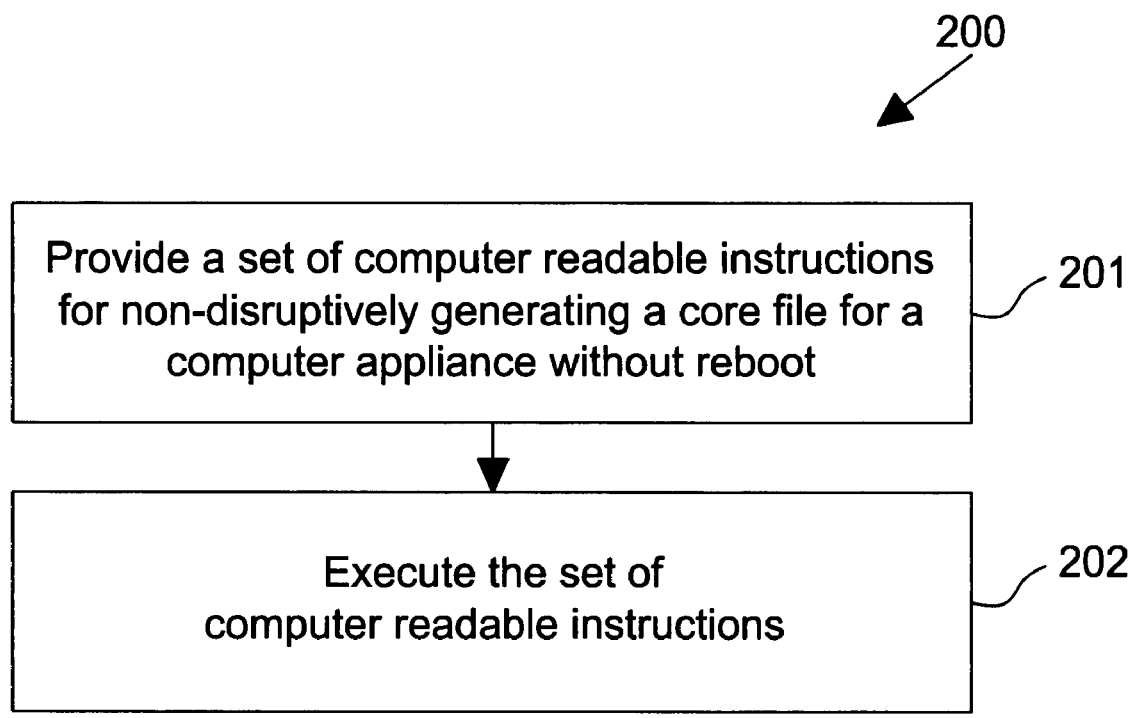
FIG. 2 is a flow chart illustrating a method for non-disruptively generating a core file for a computer appliance without reboot, in accordance with an exemplary embodiment of the present invention.

Referring now to FIG. 2, method 200 for non-disruptively generating a core file for a computer appliance without reboot, in accordance with an exemplary embodiment of the present invention, is illustrated. In step 201, a set of computer readable instructions for non-disruptively generating a core file for a computer appliance without rebool are provided. In step 202, the set of computer readable instructions for non-disruptively generating a core file for a computer appliance without rebool are executed. "Non-disruptively" means that there is no significant impact on any users of the computer appliance and the computer appliance can resume normal operation after generation of the core file.

The set of instructions may comprise a command for generating a core file. The set of instructions, when executed, may automatically generate support collateral. The set of instructions, when executed, may cause the core file to be generated after a delay such that the instructions have finished executing before the core file is generated. The core file may be a synchronous core file or an asynchronous core file. The core file may be generated to memory or to disk. The memory to which the core file is generated may include, but is not limited to, static or dynamic RAM, flash memory, or a removable memory device such as a USB memory device or a PCMCIA memory device.

Figure 3:
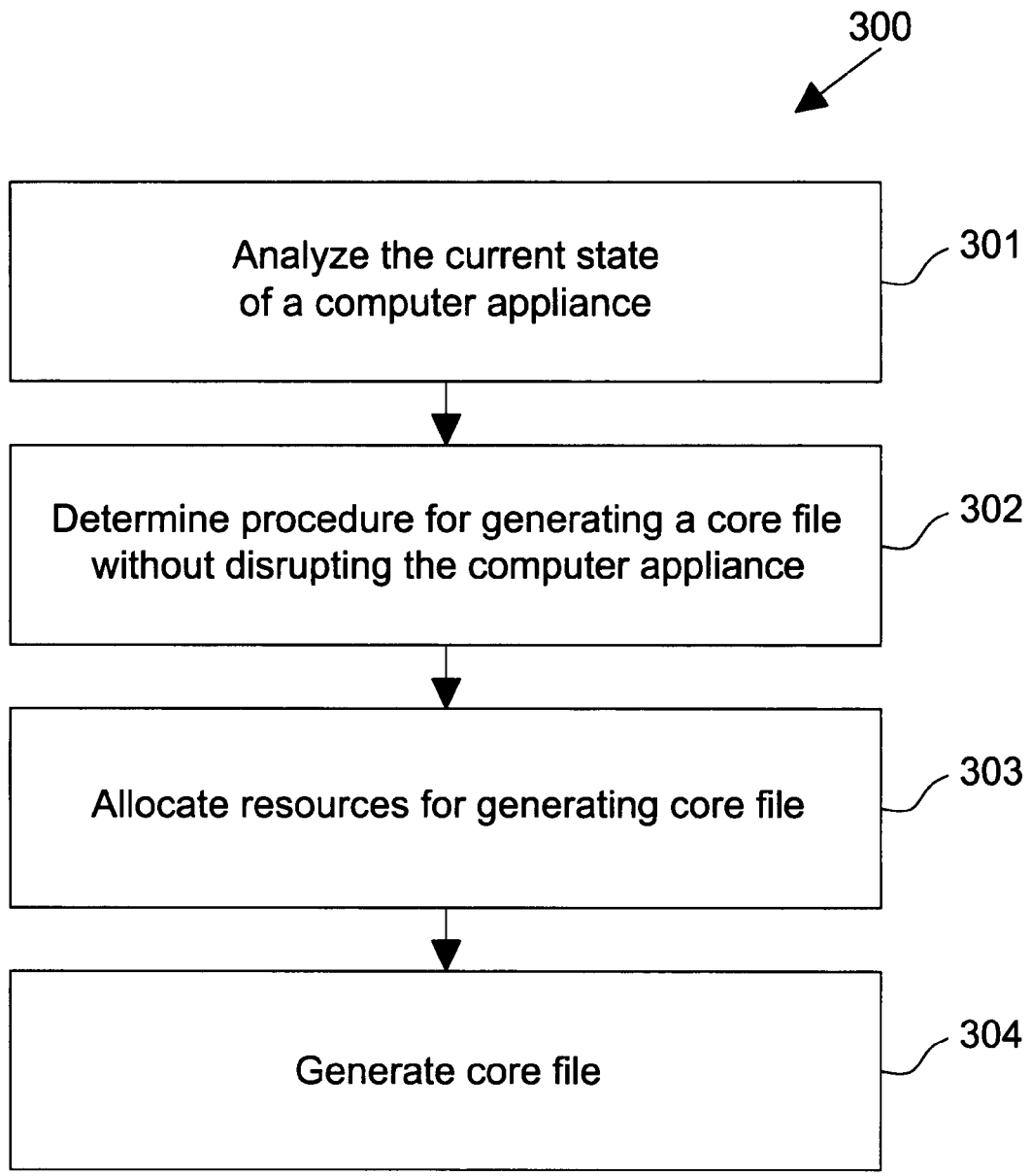
FIG. 3 is a is a flow chart illustrating a method for non-disruptively generating a core file for a computer appliance without reboot, in accordance with an alternative embodiment of the present invention.

Referring now to FIG. 3, method 300 for non-disruptively generating a core file for a computer appliance without reboot, in accordance with an alternative embodiment of the present invention, is illustrated. In step 301, the current state of a computer appliance is analyzed. In step 302, a procedure for generating a core file which will not disrupt the computer appliance, is determined. In step 303, resources for generation of the core file are allocated. Resources may include processor resources. Resources may include worker threads to generate the core file. Resources may include memory or disk space to generate the core file to. Memory resources may include RAM, flash memory, and removable memory devices such as USB memory devices and PCMCIA memory devices. Resources may include disk I/O (input/output) throughput. In step 304, the core file is generated without disrupting the computer appliance.

Figure 4:
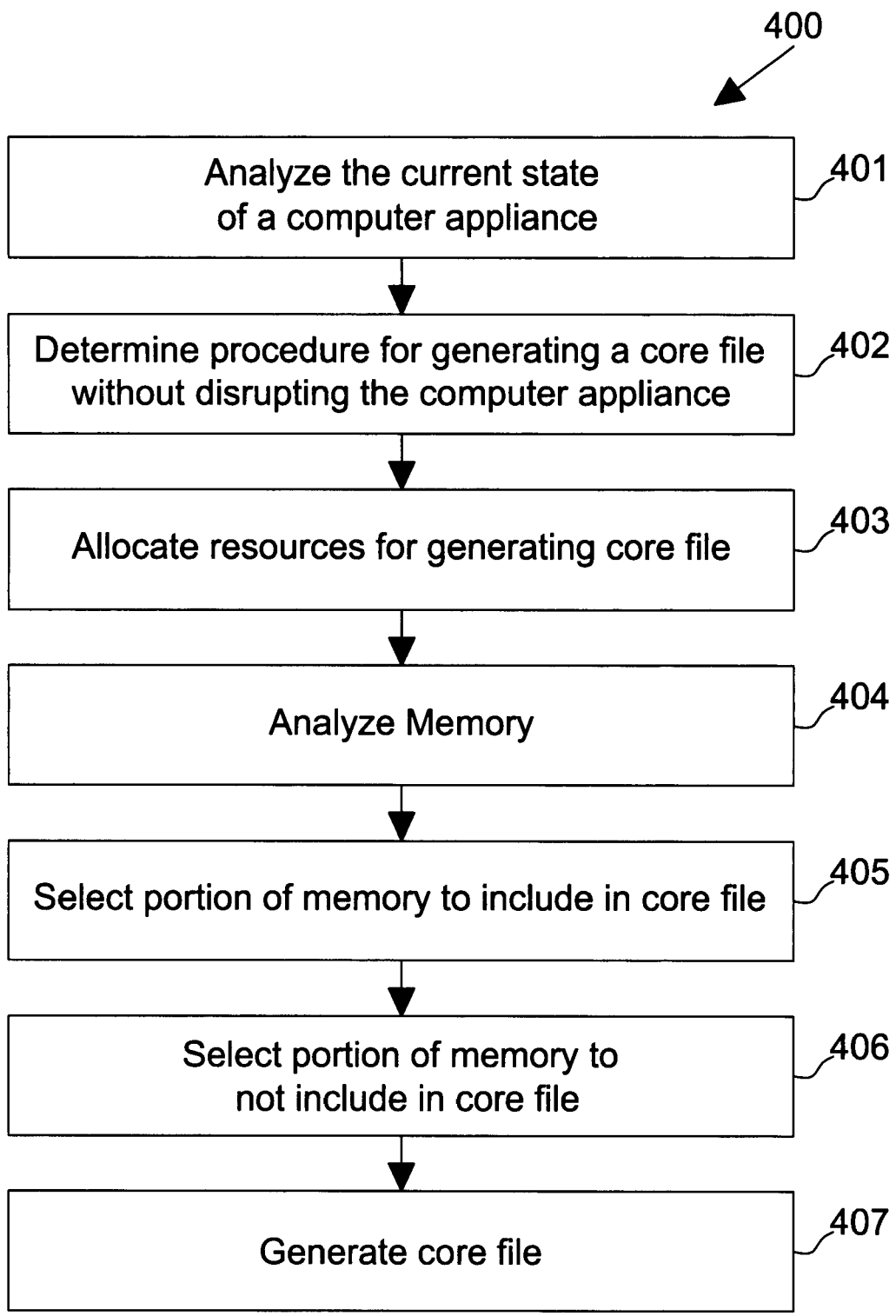
FIG. 4 is a is a flow chart illustrating a method for non-disruptively generating a core file for a computer appliance without reboot, in accordance with an alternative embodiment of the present invention.

Referring now to FIG. 4, method 400 for non-disruptively generating a core file for a computer appliance without reboot, in accordance with an alternative embodiment of the present invention, is illustrated. In step 401, the current state of a computer appliance is analyzed. In step 402, a procedure for generating a core file which will not disrupt the computer appliance, is determined. In step 403, resources for generation of the core file are allocated. Resources may include processor resources. Resources may include worker threads to generate the core file. Resources may include memory or disk space to generate the core file to. Memory resources may include RAM, flash memory, and removable memory devices such as USB memory devices and PCMCIA memory devices. Resources may include disk I/O (input/output) throughput. In step 404, the memory of the computer appliance is analyzed. In step 405, a portion of memory to be included in the core file is selected. In step 406, a portion of memory not to be included in the core file is selected. In step 407, the core file is generated without disrupting the computer appliance.

Figure 5:
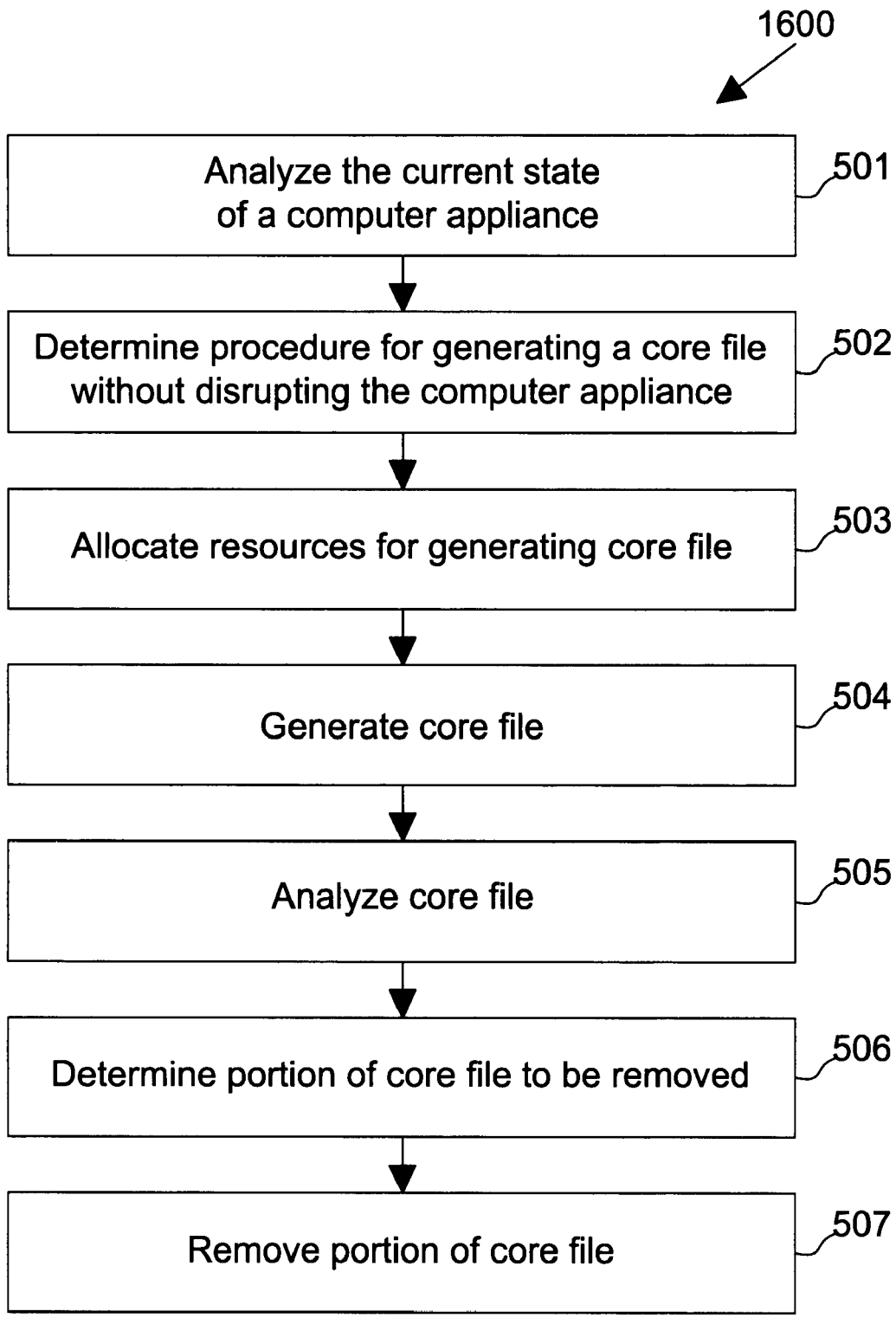
FIG. 5 is a is a flow chart illustrating a method for non-disruptively generating a core file for a computer appliance without reboot, in accordance with an alternative embodiment of the present invention.

Referring now to FIG. 5, method 500 for non-disruptively generating a core file for a computer appliance without reboot, in accordance with an alternative embodiment of the present invention, is illustrated. In step 501, the current state of a computer appliance is analyzed. In step 502, a procedure for generating a core file which will not disrupt the computer appliance, is determined. In step 503, resources for generation of the core file are allocated. Resources may include processor resources. Resources may include worker threads to generate the core file. Resources may include memory or disk space to generate the core file to. Memory resources may include RAM, flash memory, and removable memory devices such as USB memory devices and PCMCIA memory devices. Resources may include disk I/O (input/output) throughput. In step 504, the core file is generated without disrupting the computer appliance. In step 505, the core file is analyzed. In step 506, a portion of the core file to be removed is determined. In step 507, the portion of the core file is removed.

Figure 6:
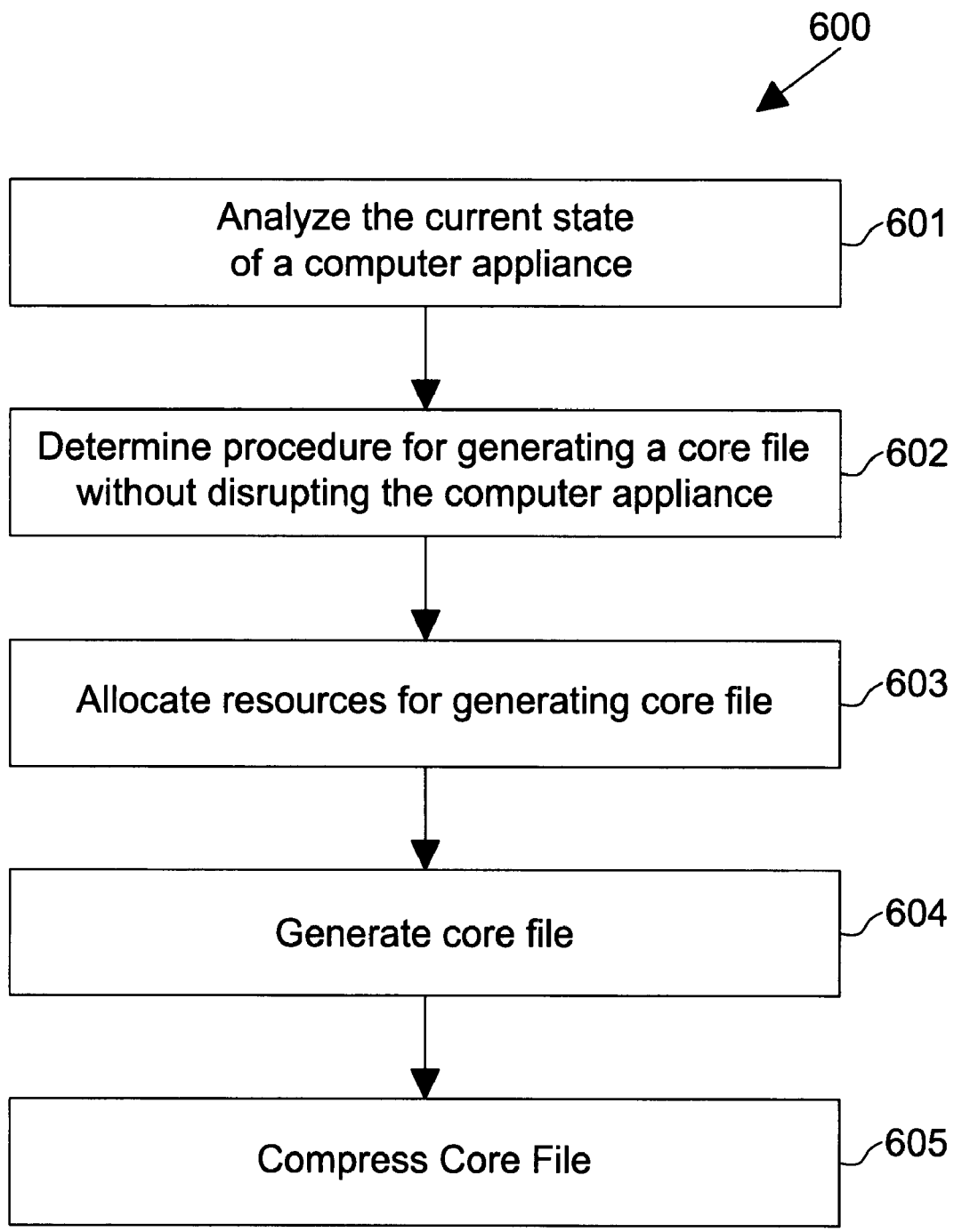
FIG. 6 is a flow chart illustrating a method for non-disruptively generating a core file for a computer appliance without reboot, in accordance with an alternative embodiment of the present invention.

Referring now to FIG. 6, method 600 for non-disruptively generating a core file for a computer appliance without reboot, in accordance with an alternative embodiment of the present invention, is illustrated. In step 601, the current state of a computer appliance is analyzed. In step 602, a procedure for generating a core file which will not disrupt the computer appliance, is determined. In step 603, resources for generation of the core file are allocated. Resources may include processor resources. Resources may include worker threads to generate the core file. Resources may include memory or disk space to generate the core file to. Memory resources may include RAM, flash memory, and removable memory devices such as USB memory devices and PCMCIA memory devices. Resources may include disk I/O (input/output) throughput. In step 604, the core file is generated without disrupting the computer appliance. In step 605, the core file is compressed. The core file may be compressed utilizing any compression algorithm without departing from the scope of the present invention including, but not limited to the LZW (Lempel-Ziv_Welch) compression algorithm and the zlib compression algorithm.

Figure 7:
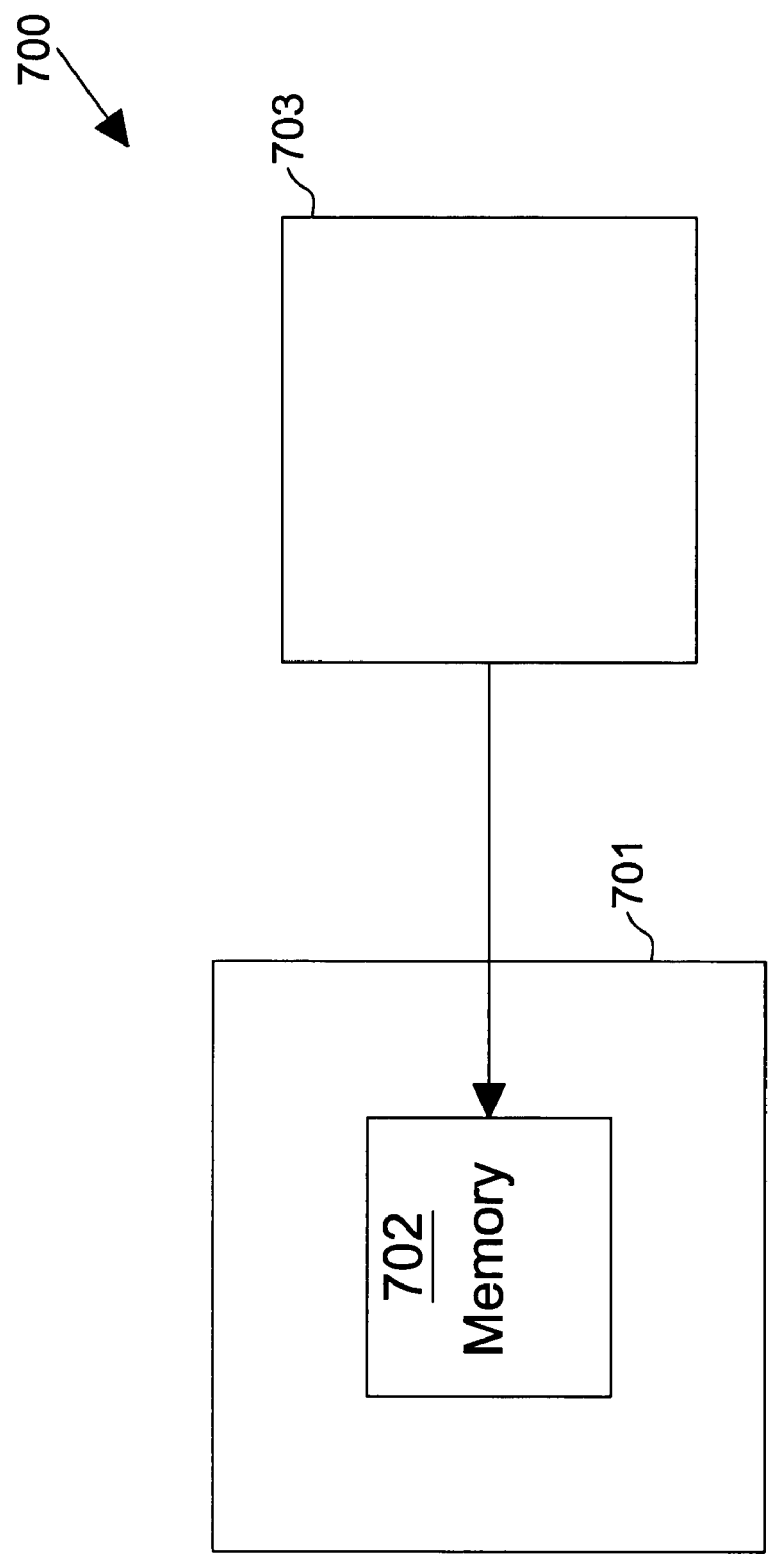
FIG. 7 is a block diagram illustrating a system for generating a non-disruptive core file for a computer appliance without reboot, in accordance with an alternative embodiment of the present invention.

Referring now to FIG. 7, a system 700 for generating a non-disruptive core file for a computer appliance, in accordance with an alternative embodiment of the present invention, is illustrated. The system 700 comprises computer appliance 701, which includes memory 702, and client 703. The client 703 may access computer appliance 701 and read the memory 702. The client 703 may be separate from computer appliance 701 or may be included within computer appliance 701. Client 703 may read the memory 702 of computer appliance 701 via, including but not limited to, a network connection. The computer appliance 701 may include a block special file which represents the memory space, or current contents, of the memory 702. The client 703 may read the memory 702 by reading the block special file. The client 703 may then generate a core file for the computer appliance 701 without disrupting or rebooting the computer appliance 701.

The computer appliance 701 may comprise a Network-Attached Storage device produced by Network Appliance, Inc. and may run the Data ONTAP® storage operating system. The block special file may comprise a "/dev/kmem" file.

Figure 8:
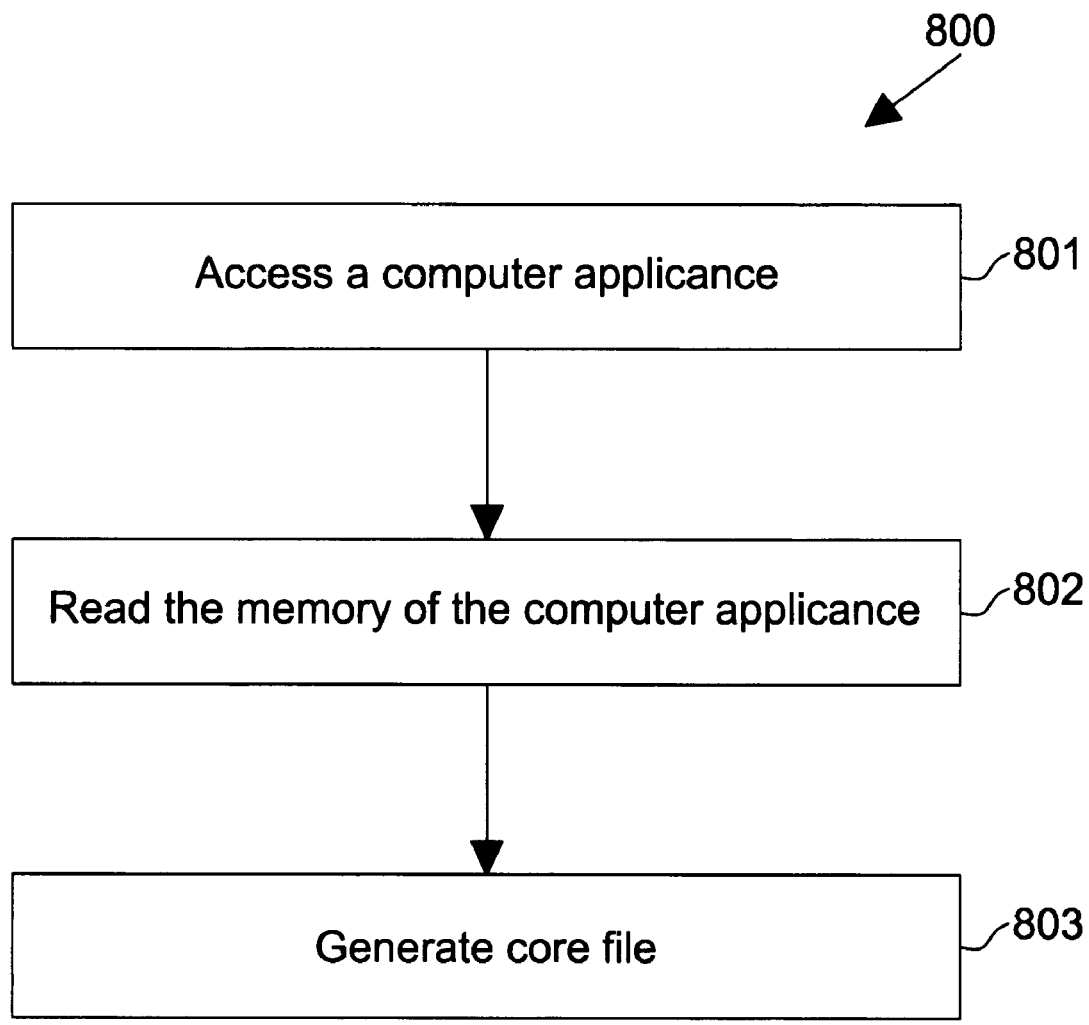
FIG. 8 is a flow chart illustrating a method for generating a non-disruptive core file for a computer appliance without reboot, in accordance with an exemplary embodiment of the present invention.

Referring now to FIG. 8, a method 800 for generating a non-disruptive core file for a computer appliance, in accordance with an exemplary embodiment of the present invention, is illustrated. In step 801, a computer appliance is accessed. In step 802, the memory of the computer appliance is read. In step 803, a core file for the computer appliance is generated without disrupting or rebooting the computer appliance.

The computer appliance may include a block special file which represents the memory space, or current contents, of the memory. The memory may be read by reading the block special file. The block special file may comprise a "/dev/kmem" file.

The present invention allows for the creation of core files without disrupting or rebooting the computer appliance. This allows for diagnoses of potential problems with the computer appliance without requiring downtime. Also, core files can be generated for purposes of diagnosing potential problems with the computer appliance when potential problems manifest, regardless if potential problems manifest during periods of critical activity or less critical activity.

Figure 9:
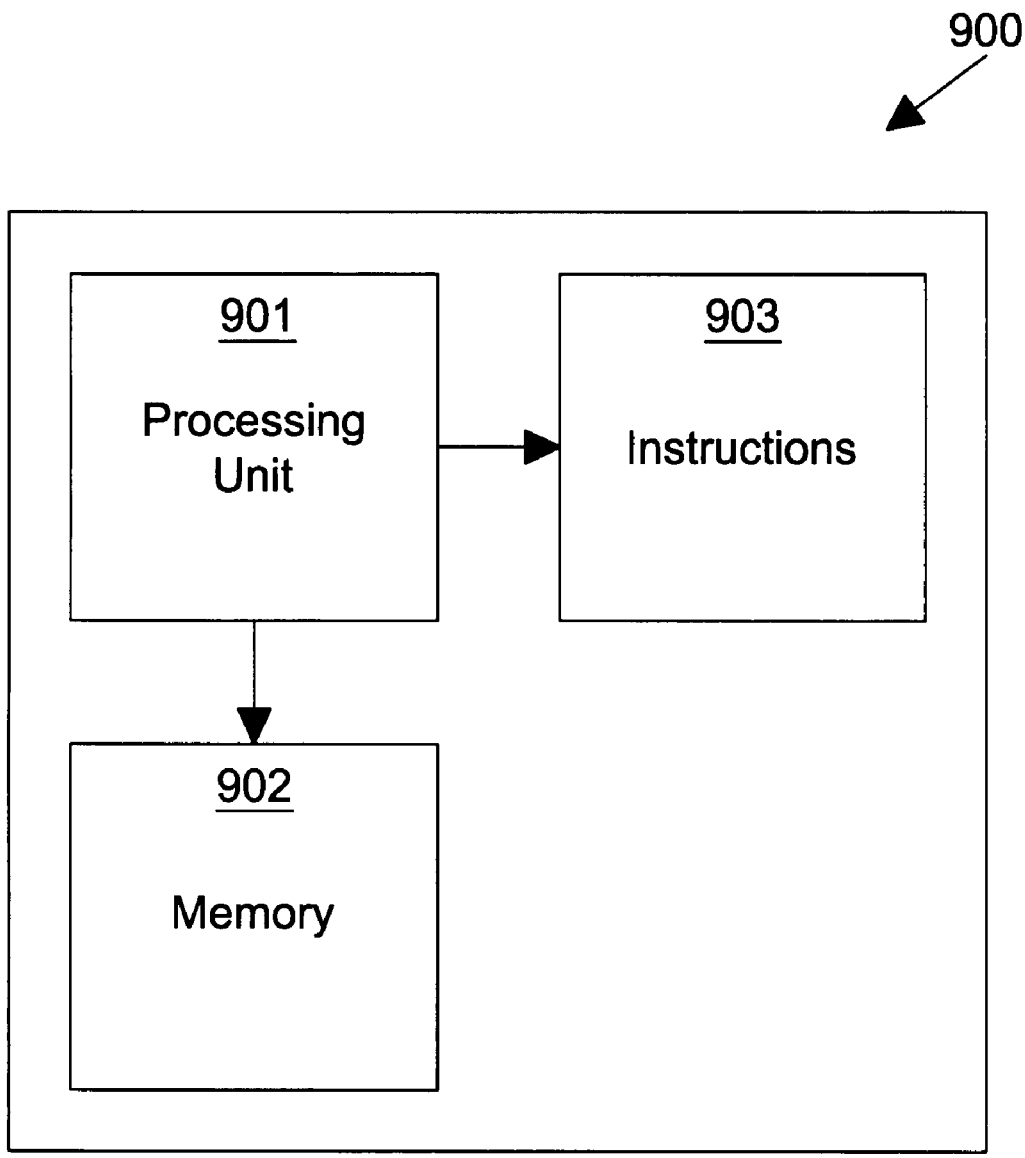
FIG. 9 is a block diagram illustrating a computer appliance, in accordance with an alternative embodiment of the present invention.

Referring generally to FIG. 9, a computer appliance 900 in accordance with an alternative embodiment of the present invention is illustrated. The computer appliance 900 includes processing unit 901, memory 902 coupled to the processing unit 901, and instructions 903 for generating a core file embodied in a tangible medium and executable by the processing unit. The instructions 903 may be embodied in memory, which may be read by the processing unit 901. The instructions 903 may be embodied on disk, which the processing unit 901 may instruct to be read into memory. The instructions 903 may be embodied in a ROM (read only memory) chip, which is readable by the processing unit 901. The core file is a recording of the working state of memory 902 at a specific time. When the instructions 903 are executed by the processing unit 901, a core file is generated and a support collateral is automatically generated. The support collateral is information related to the computer appliance used to support diagnosis of potential problems. The support collateral may be included within the core file or may comprise a separate file.

The instructions 903, when executed by the processing unit, may generate the core file without disrupting or rebooting the computer appliance. The instructions 903, when executed by the processing unit, may cause the core file to be generated after a delay such that the instructions 903 have finished executing before the core file is generated. The instructions 903, when executed by the processing unit, may attempt to verify that the support collateral has been generated prior to generating the core file. The instructions 903, when executed by the processing unit, may generate a core file after the support collateral has been generated. Alternatively, as a fail-safe, the instructions 903, when executed by the processing unit, may generate a core file prior to the generation of a support collateral if generation of a support collateral is unable to finish. In this way if generation of a support collateral fails a core file is not prevented from generating. Such a fail-safe may be a time established for generation of a support collateral after which time (regardless whether generation of a support collateral has finished) a core file is generated. Alternatively, such a fail-safe may be a timer, which is reset whenever progress is made in generating a support collateral, wherein a core file is generated upon expiration of the timer regardless whether generation of a support collateral has finished.

The support collateral may include kernel profiting, performance data, disk statistics, protocol statistics, memory statistics, memory usage reports, or any other report which can be generated concerning the computer appliance. The instructions 903, when executed by the processing unit 901, may make a record of an instruction pointer active in a process running on the processing unit 901. The instructions 903, when executed by the processing unit 901, may then match the record of the instruction pointer to a symbol table and generate a report. The instructions 903, when executed by the processing unit 901, may read one or more counters. The instructions 903, when executed by the processing unit 901, may initialize the one or more counters prior to reading the one or more counters. The instructions 903, when executed by the processing unit 901, may wait for a period of time and then read the one or more counters a second time. The instructions 903, when executed by the processing unit 901, may then record the change in the one or more counters between the first and second reading of the one or more counters. The instructions 903, when executed by the processing unit 901, may generate a periodic sampling report of system statistics, such as the systat command, for the duration of the generation of support collateral.

The computer appliance 900 may comprise a Network-Attached Storage device (NAS) produced by Network Appliance, Inc. and may run the Data ONTAP® storage operating system. The instructions 903 may be implemented as a functional API (application programming interface) module (a source code interface that a computer system or program library provides in order to support requests for services to be made of it by a computer program). The instructions 903 may comprise a command for generating a core file. The command may be a command within the Data ONTAP® storage operating system. The command may be the default mechanism for the "halt -d" command within the Data ONTAP® storage operating system. The instructions 903, when executed by the processing unit 901, may initiate a pre-defined set of commands as separate threads, monitor them for a selected time period, and either terminate them or invoke the closing variant of the command (such as the prof(off) variant of the prof( ) command or the systat(stop) variant of the systat( ) command). The pre-defined set of commands may include, but are not limited to, commands such as the "perfstat", "systat", "vol status", "ps", or "prof" commands within the Data ONTAP® storage operating system or the Unix or Windows operating systems. The pre-defined set of commands may be able to be supplemented or replaced by a set of commands read from disk or specified on a command line. A supplemental or replacement set of commands may include, but is not limited to, commands such as the "pktt" command within the Data ONTAP® storage operating system or the Unix or Windows operating systems. A set of commands read from disk may comprise a scripting file. The instructions 903, when executed by the processing unit 901, may then record the state to disk and generate a core file. Although the present invention is described in the context of the Data ONTAP® storage operating system or the Unix or Windows operating systems, a person of ordinary skill in the art would understand that any operating system can be utilized without departing from the scope of the present invention.

An example of code for a halt command for a computer appliance which may generate a core file which does not automatically generate a support collateral is as follows:

```
Cmd_halt(bool dump_core)
{
If (dump_core==true) {
   Dump_core( );
}
For (subsys=0; subsys<max_subsys; subsys++) {
   Shutdown_subsystem(subsys)
}
Halt_processors( );
}
```

In the above example, if dump_core is true, then a core file is generated. Otherwise, the subsystems are shut down, and the processors are halted. The following is an example of code for a halt command for a computer appliance which may generate a core file which automatically generates support collateral:

```
Cmd_halt(bool dump_core, bool generate_support_collateral=TRUE, integer support_runtime=15)
{
    If (dump_core==true) {
        If (TRUE==generate_support_collateral){
            //set failsafe in case support collateral generation fails
            Kernel_set_dump_core_failsafe_timer(1.25*support_runtime);
            Generate_support_collateral(support_runtime);
            Kernel_clear_dump_core_failsafe_timer( );
        }
        Dump_core( );
    }
    For (subsys=0; subsys<max_subsys; subsys++) {
        Shutdown_subsystem(subsys)
    }
    Halt_processors( );
}
```

In the above example, if dump_core is true and if the generate_support_collateral value is set to TRUE, which it is unless overridden, a support collateral is generated and then a core file is generated. Otherwise, if a core file is to be generated but the generate_support_collateral value is set to FALSE, then only a core file is generated. If a core file is not to be generated, then the subsystems are shut down and the processors are halted. Thus, the generation of support collateral is embedded within the generation of a core file. The following is an example of code for the generation of the support collateral:

```
Generate_support_collateral(integer support_runtime=15)
{
    For (cmd=0; cmd<cmd_max; cmd++) {
        If (TRUE==collateral_cmd[cmd].requires_process) {
            //command runs continuously and needs its own
            //process
            Spawn(collateral_cmd[cmd].initialize_function,
                collateral_cmd[cmd].initialize_arguments);
        } Else {
            //command just reads counters and does not need own
            //process
            Execute(collateral_cmd[cmd].initialize_function,
                collateral_cmd[cmd].initialize_arguments);
        }
    }
    Sleep(support_runtime);
    For(cmd=0; cmd<cmd_max; cmd++) {
        If (TRUE==collateral_cmd[cmd].requires_process) {
            //command runs continuously and needs shutdown
            Spawn(collateral_cmd[cmd].finalize_function,
                collateral_cmd[cmd].finalize_arguments);
        } Else {
            //command just reads needs counters read
            Execute(collateral_cmd[cmd].finalize_function,
                collateral_cmd[cmd].finalize_arguments);
        }
    }
}
```

In the above example, each of the commands in a table of commands for generating a support collateral are executed. If the command requires its own process, one is generated for that command. Once all commands in the table of commands are generated, the code waits for the amount of time which the support collateral is to take to generate. Once the amount of time is up commands which required processes are shutdown and any applicable counters for the command are read. Thus, the support collateral has been generated. The following is an example of code for a table of commands:

```
Typedef struct support_cmd_s {
    Boolean requires_process;
    Void fcn(char*args) initialize_function;
    Char initialize_arguments;
    Void fcn(char*args) finalize_function;
    Char*finalize_arguments;
} support_cmd_t=
}
//process statistics
{false, //no process required
Cmd_ps( ), "-z", Cmd_ps( ), " "},
//execution profiling
{false, //no process required
Cmd_prof( ) "on", Cmd_prof( ) "off"},
//system statistics monitor
{true, //process required, runs continuously
Cmd_systat( ) "-t 1", Cmd_systat( ), "stop"}
} collateral_cmd;
```

In the above example, the table of commands contains the initialization and finalization commands along with required arguments for generating process statistics, executing profiling, and system statistics monitoring. The above code is intended as example only and does not limit the scope of the invention.

Figure 10:
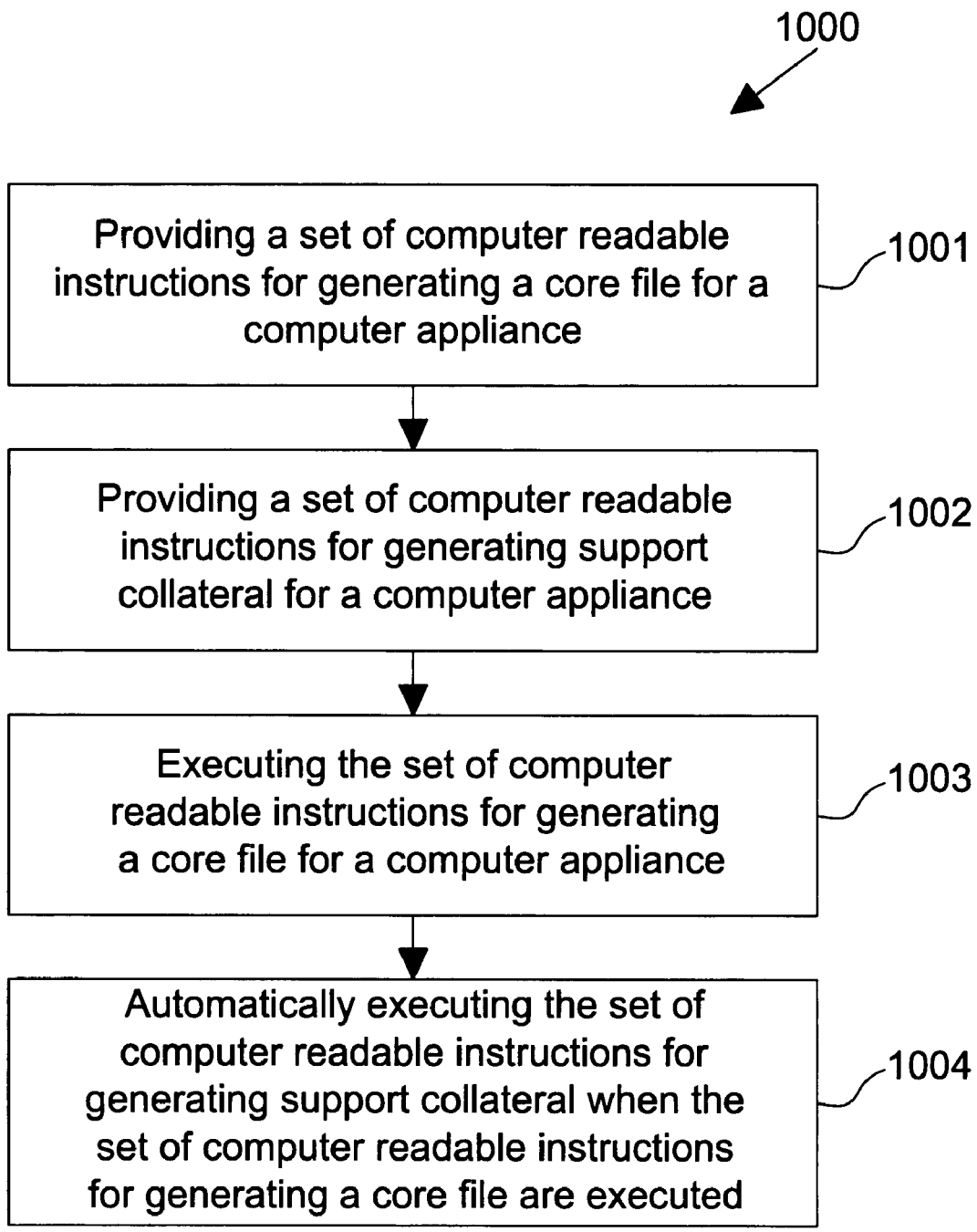
FIG. 10 is a flow chart illustrating a method for automatically generating support collateral when generating a core file for a computer appliance, in accordance with an exemplary embodiment of the present invention.

Referring now to FIG. 10, a method 1000 for automatically generating a support collateral when generating a core file for a computer appliance, in accordance with an exemplary embodiment of the present invention, is illustrated. In step 1001, a set of computer readable instructions for generating a core file for a computer appliance are provided. In step 1002, a set of computer readable instructions for generating a support collateral for a computer appliance are provided. In step 1003, the set of computer readable instructions for generating a core file for a computer appliance are executed. In step 1004, the set of computer readable instructions for generating a support collateral for a computer appliance are automatically executed when the set of computer readable instructions for generating a core file are executed. The support collateral may be included within the core file or may comprise a separate file.

The instructions for generating a core file, when executed, may generate the core file without disrupting or rebooting the computer appliance. The instructions for generating a core file, when executed, may cause the core file to be generated after a delay such that the instructions have finished executing before the core file is generated. The instructions for generating a core file, when executed, may attempt to verify that the support collateral has been generated prior to generating the core file. The instructions for generating a core file, when executed, may generate a core file after the support collateral has been generated. Alternatively, as a fail-safe (a precautionary mechanism which minimizes harm in cases of failure), the instructions for generating a core file, when executed, may generate a core file prior to the generation of a support collateral if generation of a support collateral is unable to finish. In this way if generation of a support collateral fails a core file is not prevented from generating. Such a fail-safe may be a time established for generation of a support collateral after which time (regardless whether generation of a support collateral has finished) a core file is generated. Alternatively, such a fail-safe may be a timer, which is reset whenever progress is made in generating a support collateral, wherein a core file is generated upon expiration of the timer regardless whether generation of a support collateral has finished.

The support collateral may include kernel profiling, performance data, disk statistics, protocol statistics, memory statistics, memory usage reports, or any other report which can be generated concerning the computer appliance. The instructions for generating a support collateral, when executed, may make a record of an instruction pointer active in a process running on the computer appliance. The instructions for generating a support collateral, when executed, may then match the record of the instruction pointer to a symbol table and generate a report. The instructions for generating a support collateral, when executed, may read one or more counters. The instructions for generating a support collateral, when executed, may initialize the one or more counters prior to reading the one or more counters. The instructions for generating a support collateral, when executed, may wait a period of time and then read the one or more counters a second time. The instructions for generating a support collateral, when executed, may then record the change in the one or more counters between the first and second reading.

The instructions for generating a core file and for generating a support collateral may be implemented as a functional API (application programming interface) module (a source code interface that a computer system or program library provides in order to support requests for services to be made of it by a computer program). The instructions for generating a core file and for generating a support collateral may comprise a command for generating a core file and/or for generating a support collateral. The command may be a command within the Data ONTAP® storage operating system. The command may be the default mechanism for the "halt -d" command within the Data ONTAP® storage operating system. The instructions for generating a core file and for generating a support collateral, when executed, may initiate a pre-defined set of commands as separate threads, monitor them for a selected time period, and either terminate them or invoke the closing variant of the command. The pre-defined set of commands may include, but are not limited to, commands such as the "perfstat", "systat", "vol status", "ps", or "prof" commands within the Data ONTAP® storage operating system or the Unix or Windows operating systems. The pre-defined set of commands may be able to be supplemented or replaced by a set of commands read from disk or specified on a command line. A supplemental or replacement set of commands may include, but is not limited to, commands such as the "pktt" command within the Data ONTAP® storage operating system or the Unix or Windows operating systems. A set of commands read from disk may comprise a scripting file. The instructions for generating a core file and for generating a support collateral, when executed, may then record the state to disk and generate a core file. Although the present invention is described in the context of the Data ONTAP® storage operating system or the Unix or Windows operating systems, a person of ordinary skill in the art would understand that any operating system can be utilized without departing from the scope of the present invention.

Figure 11:
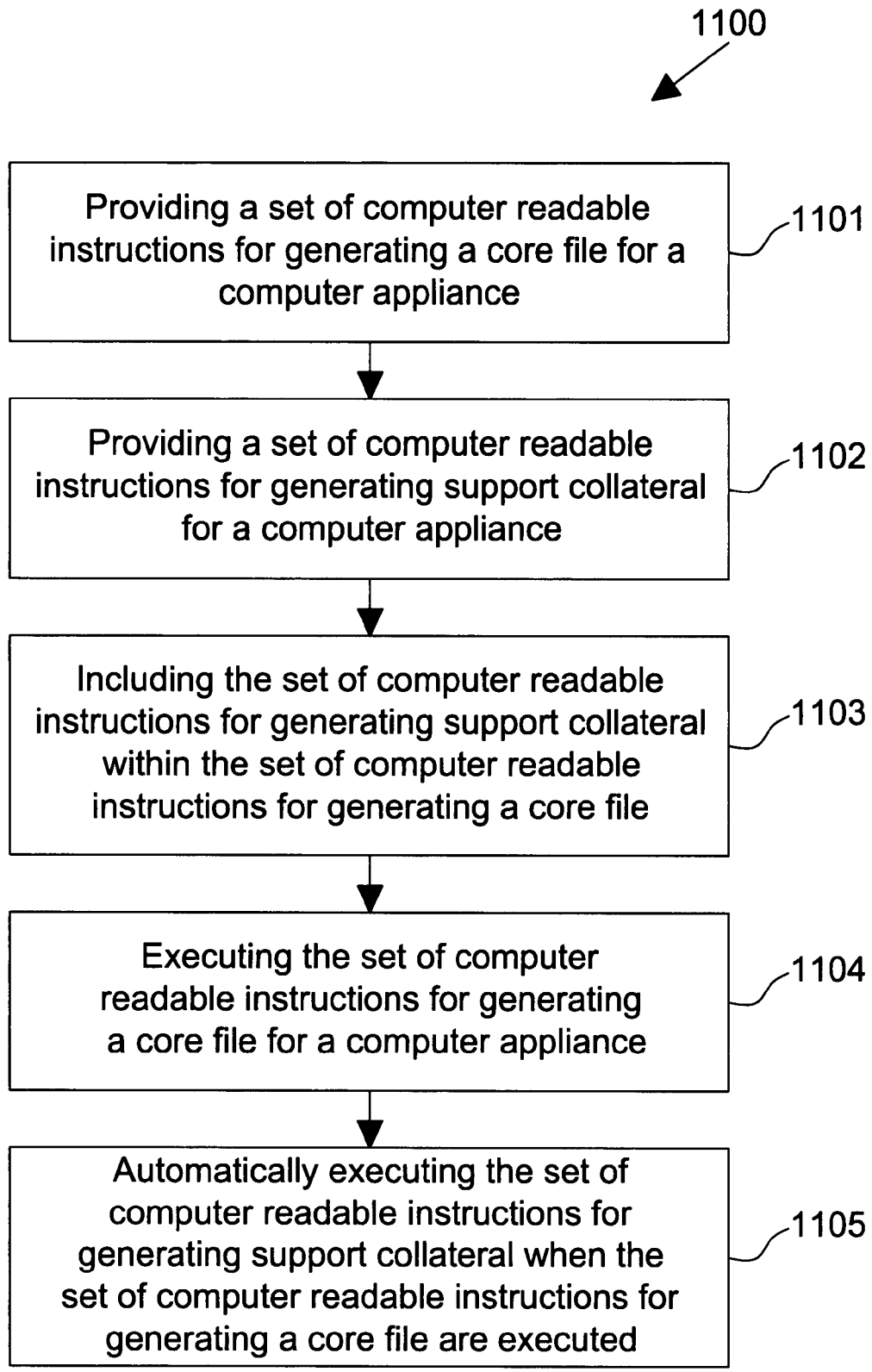
FIG. 11 is a flow chart illustrating a method for automatically generating support collateral when generating a core file for a computer appliance, in accordance with an alternative embodiment of the present invention.

Referring now to FIG. 11, a method 1100 for automatically generating a support collateral when generating a core file for a computer appliance, in accordance with an alternative embodiment of the present invention, is illustrated. In step 1101, a set of computer readable instructions for generating a core file for a computer appliance are provided. In step 1102, a set of computer readable instructions for generating a support collateral for a computer appliance are provided. In step 1003, the set of computer readable instructions for generating a support collateral are included within the set of computer readable instructions for generating a core file. In step 1104, the set of computer readable instructions for generating a core file are executed. In step 1105, the set of computer readable instructions for generating a support collateral for a computer appliance are automatically executed when the set of computer readable instructions for generating a core file are executed. The support collateral may be included within the core file or may comprise a separate file.

The present invention automatically provides the support collateral that may be required to diagnose potential problems with a computer appliance from a core file. Because the support collateral is automatically generated when the .core file is generated, the support collateral will be correctly generated and will be generated within the appropriate time of generation of the core file. Thus, diagnoses of potential problems with a computer appliance will be simplified and computer appliance downtime will be reduced.

Figure 12:
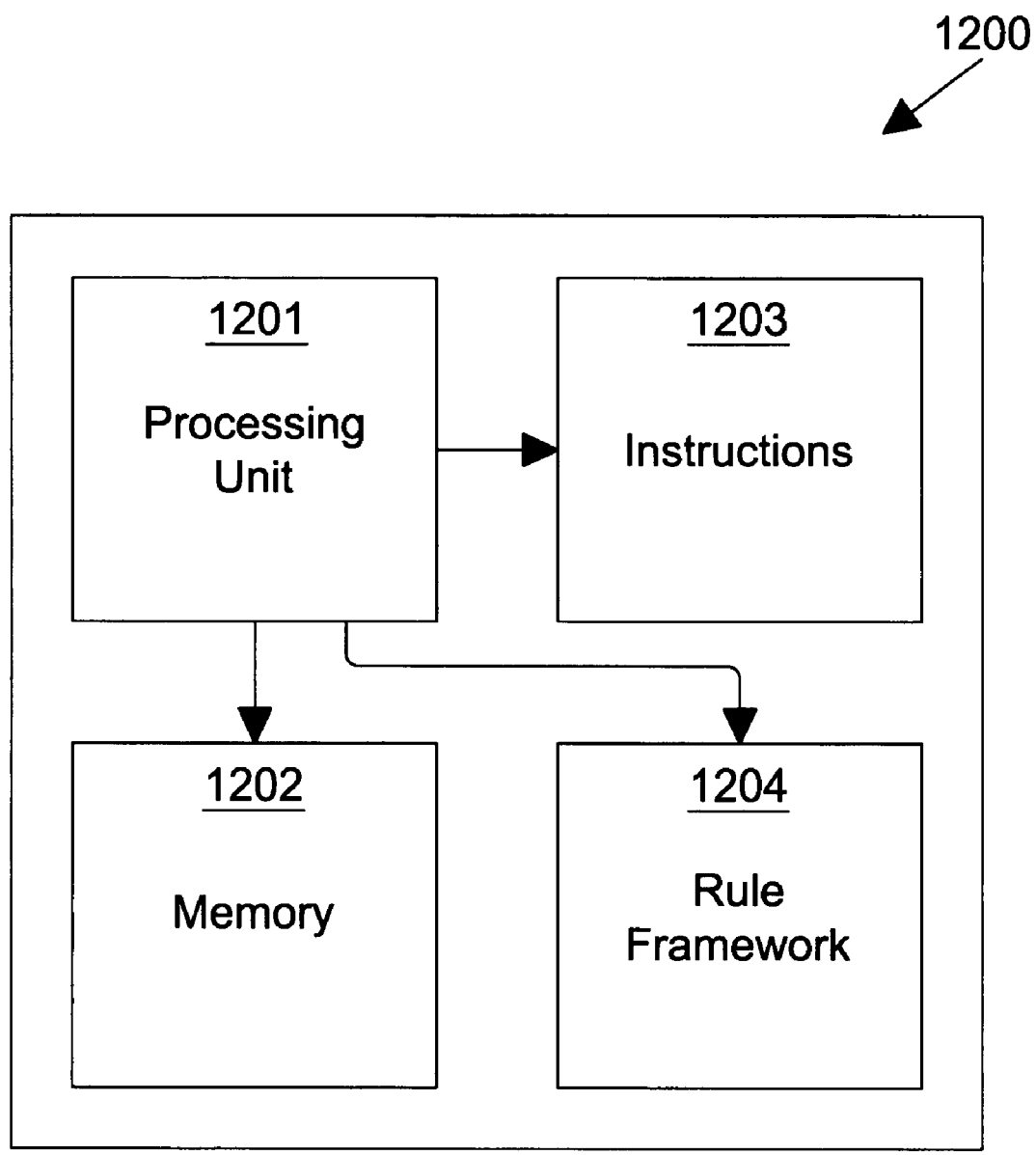
FIG. 12 is a block diagram illustrating a computer appliance, in accordance with an alternative embodiment of the present invention.

Referring generally to FIG. 12, a computer appliance 1200 in accordance with an alternative embodiment of the present invention is illustrated. The computer appliance 1200 includes processing unit 1201, memory 1202 coupled to the processing unit 1201, and instructions 1203 for generating a core file embodied in a tangible medium and executable by the processing unit 1201. The instructions 1203 may be embodied in memory, which may be read by the processing unit 1201. The instructions 1203 may be embodied on disk, which the processing unit 1201 may instruct to be read into memory. The instructions 1203 may be embodied in a ROM (read only memory) chip, which is readable by the processing unit 1201. The core file is a recording of the working state of memory 1202 at a specific time. The processing unit 1201 evaluates rules in a framework of rules 1204. When indicated to do so by a rule in the framework of rules 1204, the processing unit 1201 executes the instructions 1203 and a core file is generated. The processing unit 1201 may evaluate the rules when it encounters an inflection point. An inflection point is a critical point in the processing performed by the processing unit 1201 where processing is interrupted. Inflection points may include, but are not limited to interrupt, timer, context switch, domain switch and on demand.

The rules in the framework of rules 1204 may define triggers as to when a core file should be generated. Rules may trigger a core file when the availability of a resource falls above or below acceptable levels or any combination thereof. Rules may trigger a core file when a specific event occurs. Rules may trigger a core file when the computer appliance 1200 is running in an impacted state. The computer appliance 1200 is in an impacted state when there is a problem which affects performance or impacts functionality or usability of the computer appliance 1200.

The computer appliance 1200 may comprise a Network-Attached Storage device produced by Network Appliance, Inc. and may run the Data ONTAP® storage operating system. The instructions 1203, when executed by the processing unit 1201, may generate a core file without disrupting or rebooting the computer appliance 1200. The instructions 1203, when executed by the processing unit 1201, may automatically generate a support collateral. The instructions 1203, when executed by the processing unit 1201, may cause the core file to be generated after a delay such that the instructions 1203 have finished executing before the core file is generated.

Figure 13:
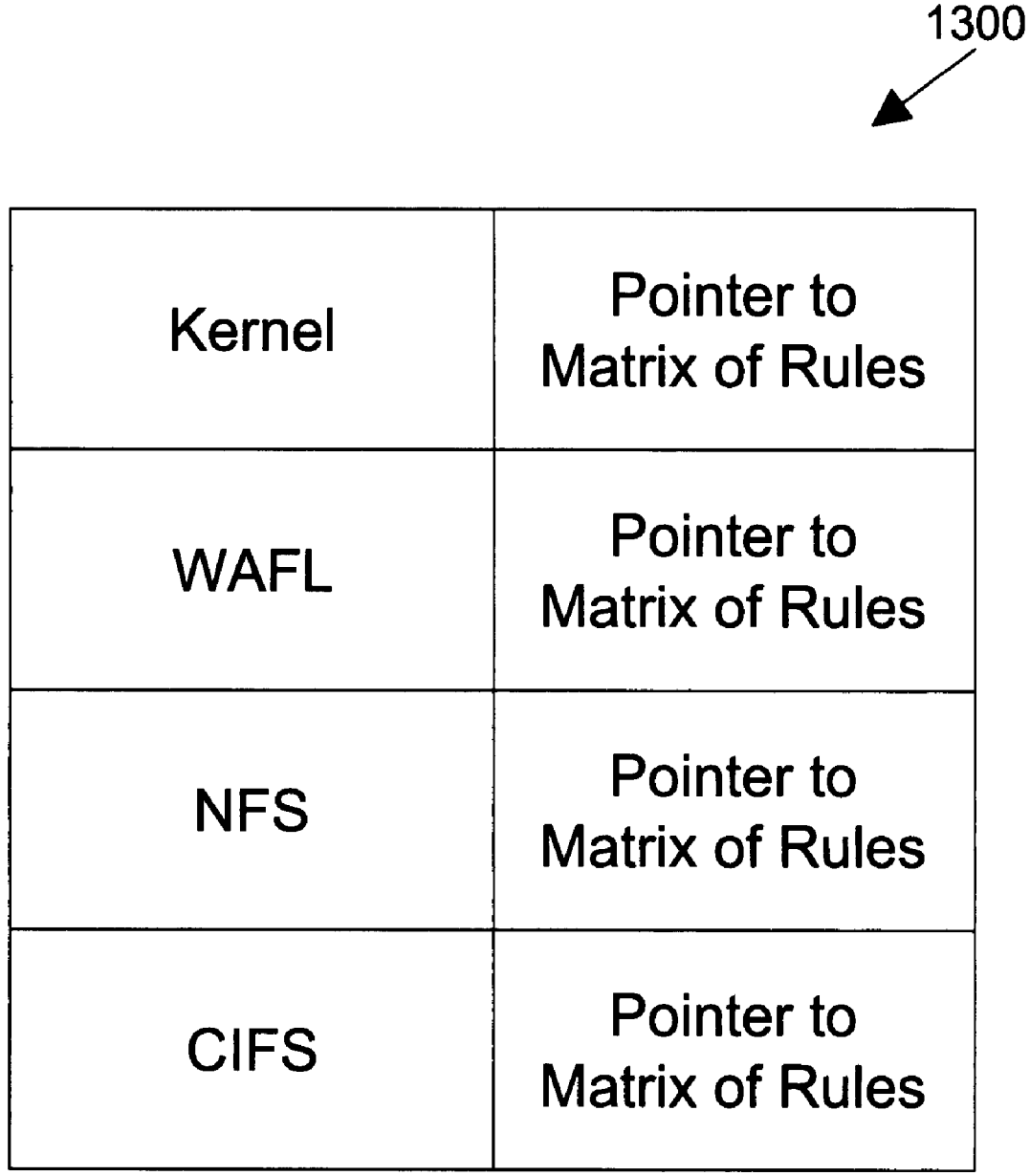
FIG. 13 is a block diagram illustrating a set of rules, in accordance with an exemplary embodiment of the present invention.

Referring to FIG. 13, a set of rules 1300 (which comprises the framework of rules 1204) is illustrated, in accordance with an exemplary embodiment of the present invention. The set of rules 1300 may be organized by subsystem. A subsystem is a functional component of the computer appliance 1200. Subsystems may include, but are not limited to, a disk subsystem, a kernel subsystem, Network File System (NFS), Common Internet File System (CIFS), Write Anywhere File Layout (WAFL), and network protocols. The set of rules 1300 may include a pointer to a matrix of rules for each subsystem.

Organizing the framework of rules 1204 into sets of rules allows the computer appliance 1200 to set when rules are to be checked but allows the individual subsystems to determine what rules are checked. A subsystem may have specific resources it requires to function properly. A subsystem may have events specific to it that are not common to the computer appliance 1200 as a whole. A WAFL subsystem may need a rule to generate a core file when back to back unproductive consistency points have occurred, when a consistency point is taking more than a certain amount of time, or when there is a critical shortage of buffers. A consistency point is the recurring event at which any new or modified data that has been temporarily cached in the system's buffer cache is committed to long-term storage (e.g., disks). An unproductive consistency point is when a consistency point is attempted and no progress is made toward completion of the consistency point. A productive consistency point is when a consistency point is attempted and progress is made toward completion of the consistency point. A CIFS or NFS subsystem may need to generate a core file when authentication activity is apparently hung, when operations per second latency is beyond a certain threshold, or when available memory buffers fall below a certain threshold. A kernel subsystem may need to generate a core file when available memory reaches or falls below a critical threshold; processes are apparently hung, not yielding, or are hogging processing time; or when apparent live locks (a situation wherein two or more competing actions constantly change with regard to one another, none progressing) or deadlocks (a situation wherein two or more competing actions are waiting for the other to finish, and thus neither ever does) occur. A subsystem may run in impacted manner even when the computer appliance 1200, as a whole, does not. A subsystem would know better than the computer appliance 1200 when there is a potential problem with the subsystem and a core file needs to be generated. Further, one subsystem may be more complex (perhaps even less mature) and require more complex rules than another subsystem. Organizing the framework of rules into sets of rules for each subsystem allows each subsystem to specify its own rules for automatic core file generation.

Figure 14:
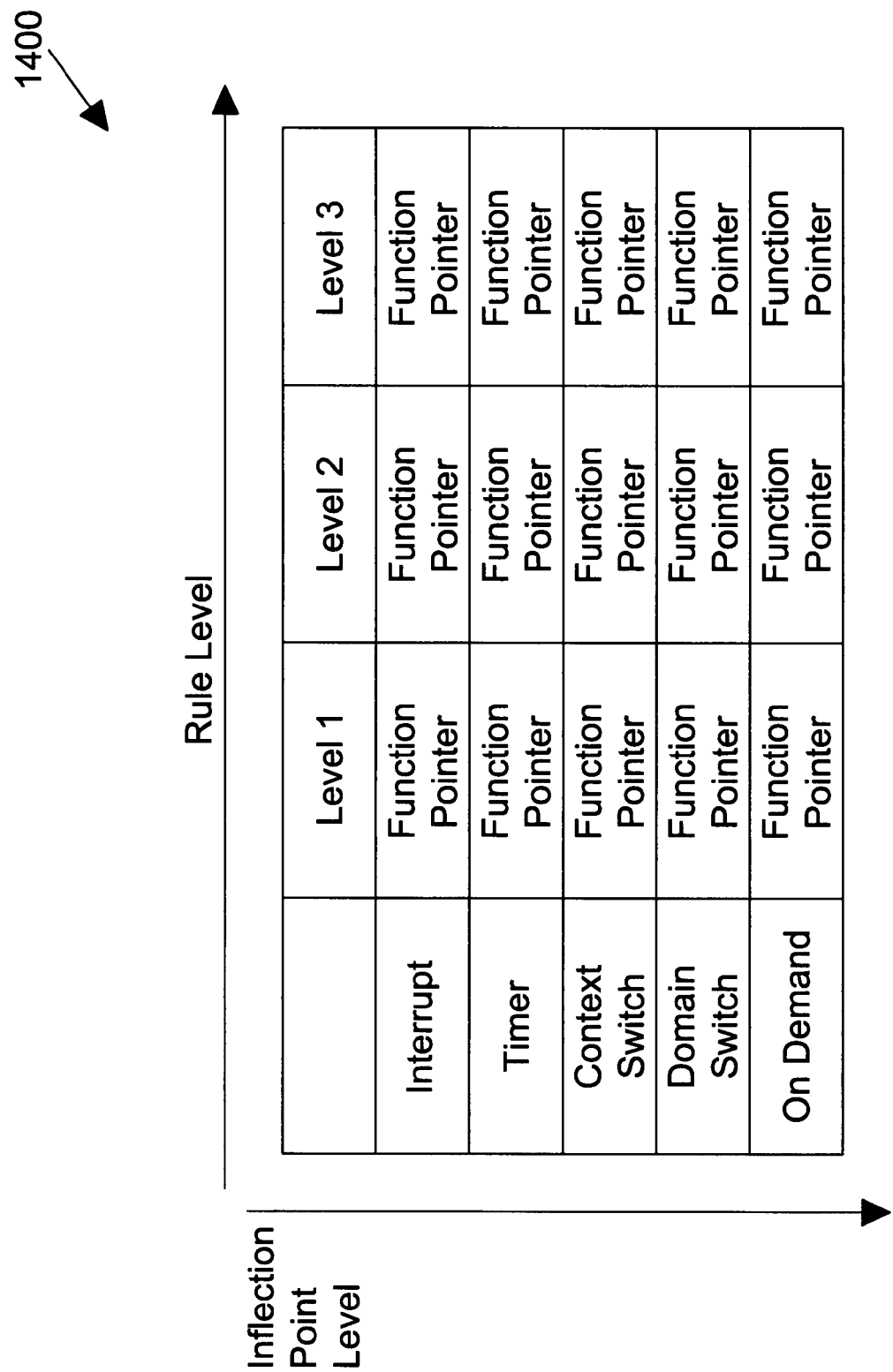
FIG. 14 is a block diagram illustrating a matrix of rules, in accordance with an exemplary embodiment of the present invention.

Referring to FIG. 14, a matrix of rules 1400 is illustrated, in accordance with an exemplary embodiment of the present invention. The matrix of rules 1400 may include a number of rules. The rules have a rule level attribute and an inflection point level attribute. The higher the rule level, the more detail the rule contains. The higher the inflection point level, the more detail the rule contains. The more detail that a rule contains the more resources of the computer appliance 1200 the processing unit 1201 requires to process the rule. Rules with different levels of detail based on inflection point levels allow for rules that are less burdensome for the processing unit 1201 to evaluate upon the occurrence of simpler, more frequent inflection points, such as interrupt, and more complex rules for more complex, less frequent inflection points, such as context switch.

The processing unit 1201 evaluates rules of a specific rule level. Rules with different levels of detail based on rule levels allow for different levels of rule invasiveness for the entire computer appliance 1200. During testing of a computer appliance 1200 the processing unit 1201 may evaluate rules of a higher level. Higher level rules may be more detailed and require more resources to evaluate, thus being more likely to generate a core file. When the computer appliance 1200 is utilized for critical applications the processing unit 1201 may evaluate rules of a low level. Lower level rules may be less detailed and require fewer resources to evaluate, thus being less likely to generate a core file. During normal operation of the computer appliance 1200 the processing unit 1201 may evaluate rules of a default level. Default level rules may be more detailed and more invasive than low level rules, but less detailed and less invasive than high level rules. Default level rules would thus be more likely to generate a core file than low level rules and more likely to generate a core file than a high level rule. The computer appliance 1200 may evaluate rules of an off level (though this essentially means rules are not evaluated), a de-tuned level, a critical level, or a debug level. Off level rules may be a level where rules are not evaluated at all. De-tuned level rules may be rules which are less detailed than default rules but are still evaluated, unlike off level rules. Critical level rules may be rules which are more detailed than default rules, perhaps for diagnostic purposes. Debug level rules may be rules which are highly detailed for purposes of beta and quality testing of the computer appliance 1200. A high rule level may be rule level 0 and a low rule level may be rule level 5, with rule level 3 being the default rule level. Alternatively, a low rule level may be rule level 1 and a high rule level may be rule level 6, with rule level 2 being the default rule level.

An example of code for performing a consistency point for a WAFL subsystem containing an on demand rule for unproductive consistency points is as follows:

```
Do_consistency_point( )
{
//flush non volatile data from non volatile ram to disk
//perform a consistency point
Demand_rule_filesys_check_unproductive_cp( )
//either a core dump has been performed or the threshold
    for
//unproductive consistency points has not been exceeded
//perform the rest of the consistency point code then return
Return
{
```

In the above example, a check for unproductive consistency points has been embedded within the code for generating consistency points for the WAFL subsystem. When a consistency point is performed the rule is evaluated. If the elapsed duration of back to back unproductive consistency points has been exceeded, a core file is generated. If the elapsed duration of back to back unproductive consistency points has not been exceeded, a core file is not generated. An example of code for the rule is as follows:

```
Void Demand_rule_filesys_check_unproductive_cp( )
{
Static allowable-time-delta;
Integer back_to_back=0;
//If the elapsed duration of back to back unproductive con-
    sistency
//points is exceeded a core file is generated
switch (rbct_wafl_level){
//Different levels allowing different durations of back to
    back
//unproductive consistency points to trigger core file gen-
    eration
Case 0: return //no core file regardless how long
Case 1:allowable-time-delta=15;
```

Case 2:allowable-time-delta=10;
Case 3:allowable-time-delta=5;
Case 4:allowable-time-delta=0; //generate core file on the first one
{
If (0!=consistency_point_work(current_cp)) {
　　//a productive consistency point occurred
　　//reset time of last productive consistency point
　　Time-last-productive-cp=current-time;
　　back_to_back=0;
}
//An unproductive consistency point occurred
//Remember this unproductive consistency point
If　((current-time−time-last-productive-cp)>allowable-time-delta &&
　　back_to_back!=0) {
　　//Time allotted elapsed & we've had more than one
　　Dump-core( );
}
}
}

In the above example, the rule evaluates whether the elapsed duration of back to back unproductive consistency points which have occurred has exceeded the elapsed duration for that level. If a productive consistency point is experienced the elapsed duration of back to back unproductive consistency points is cleared. Otherwise, if the elapsed duration has been exceeded, a core file is generated.

Using the above code as an example, a computer appliance with a WAFL subsystem and a rule level of 2 performs a consistency point after experiencing 10 seconds of back to back unproductive consistency points. The elapsed duration of back to back unproductive consistency points exceeds the threshold amount and a core file is generated. The following is an example of output which may have come from a debugger backtrace command used on the core file to diagnose a potential problem with the computer appliance:

(gdb) backtrace
　　Frame 0: panic( )
　　file panic.c line 234
　　Frame 1: Demand_rule_filesys_check_unproductive_cp( )
　　File cp.c; line 5134
　　Frame 2: Do_consistency_point
　　File cp.c; line 1035
　　Frame 3: Proc_consistency_point( )
　　File cp.c; line 52

From the above debugger output, one of skill in the art would be able to determine that a core file generation occurred in Frame 0 and that the demand rule for unproductive consistency points occurred in Frame 1 just prior to the core file generation. The following is an example of output which may have come from the debugger command to elaborate Frame 1 used on the core file:

(gdb) frame 1
　　Frame 1: Demand_rule_filesys_check_unproductive_cp( )
　　File cp.c; line 5134
　　5134 Dump-core( );

From the above debugger output, one of skill in the art would be able to determine that the rule did generate a core file. The following is an example of output which may have come from the debugger command to list the lines of code around 5134 used on the core file:

(gdb) list
　　5131　If　((current-time−time-last-productive-cp)>allowable-time-delta
　　5132 && back_to_back!=0) {
　　5133//Time allotted elapsed a we've had more than one
　　5134 Dump-core( );
　　5135 }

From the above debugger output, one of skill in the art would be able to determine that the core file was generated because current-time−time-last-productive-cp was greater than allowable-time-delta. The following is an example of output which may have come from the debugger command to print the value of current-time−time-last-productive-cp:

(gdb) print current-time−time-last-productive-cp
　　11

From the above debugger output, one of skill in the art would be able to determine that the core file was generated because 11 seconds of back to back unproductive consistency points had been experienced. Because 11 seconds of back to back unproductive consistency points had been experienced, one of skill in the art would be able to determine that a problem may exist with the file system of the computer appliance. The above code, rule, and debugger output are intended as examples only and do not limit the scope of the invention.

Figure 15:
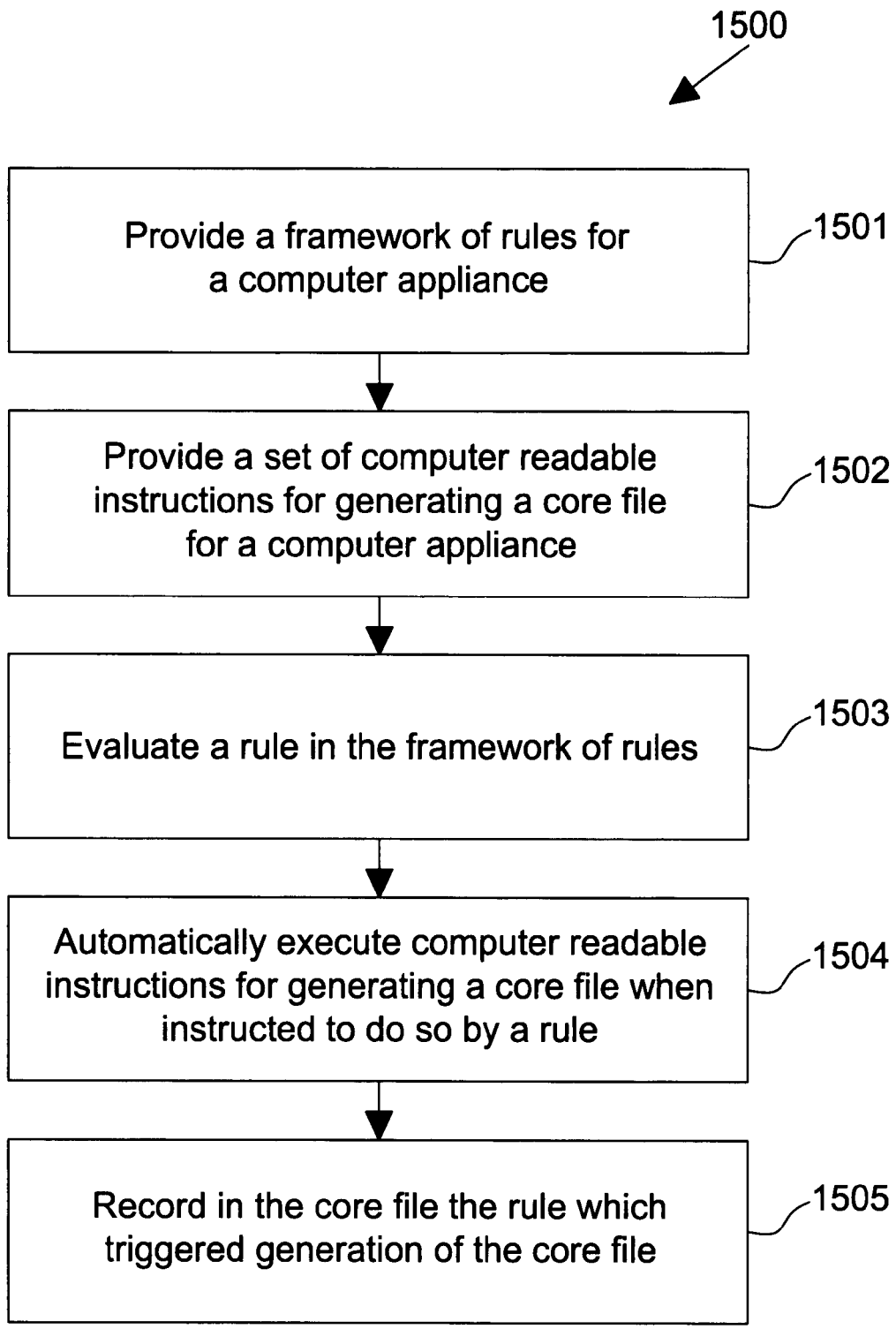
FIG. 15 is a flow chart illustrating a method for automatically generating a core file for a computer appliance, in accordance with an exemplary embodiment of the present invention.

Referring to FIG. 15, a method 1500 of automatically generating a core file for a computer appliance, in accordance with an exemplary embodiment of the present invention, is illustrated. In step 1501, a framework of rules for a computer appliance is provided. In step 1502, a set of computer readable instructions for generating a core file for a computer appliance are provided. In step 1503, a rule in the framework of rules is evaluated. In step 1504, the set of computer readable instructions for generating a core file are automatically executed when a rule instructs to do so. In step 1505, the rule which triggered the generation of the core file is recorded in the core file.

Rules may be evaluated when an inflection point is encountered. An inflection point is a critical point in the process execution where processing is interrupted. Inflection points may include, but are not limited to interrupt, timer, context switch, domain switch and on demand.

The instructions, when executed, may generate a core file without disrupting or rebooting the computer appliance. The instructions, when executed, may automatically generate a support collateral. The instructions, when executed, may cause the core file to be generated after a delay such that the instructions have finished executing before the core file is generated. The instructions for generating a core file, when executed, may attempt to verify that the support collateral has been generated prior to generating the core file. The instructions for generating a core file, when executed, may generate a core file after the support collateral has been generated. Alternatively, as a fail-safe, the instructions for generating a core file, when executed, may generate a core file prior to the generation of support collateral if generation of support collateral is unable to finish. In this way if generation of support collateral fails a core file is not prevented from generating. Such a fail-safe may be a time established for generation of support collateral after which time (regardless whether generation of support collateral has finished) a core file is generated. Alternatively, such a fail-safe may be a timer, which is reset whenever progress is made in generating support collateral, wherein a core file is generated upon expiration of the timer regardless whether generation of a support collateral has finished.

The rules in the framework of rules may define triggers as to when a core file should be generated. Rules may trigger a core file when the availability of a resource falls above or below acceptable levels or any combination thereof. Rules may trigger a core file when a specific event occurs. Rules may trigger a core file when the computer appliance is running in an impacted state.

The framework of rules may comprise sets of rules which may be organized by subsystem. A subsystem is a functional component of the computer appliance. Subsystems may include, but are not limited to, a disk subsystem, a kernel subsystem, Network File System (NFS), Common Internet File System (CIFS), Write Anywhere File Layout (WAFL), and network protocols. Each set of rules may include a pointer to a matrix of rules for each subsystem.

Organizing the framework of rules into sets of rules allows the computer appliance to set when rules are to be checked but allows the individual subsystems to determine what rules are checked. A subsystem may have specific resources it requires to function properly. A subsystem may have events specific to it that are not common to the computer appliance as a whole. A subsystem may run in an impacted manner even when the computer appliance, as a whole, does not. A subsystem would know better than the computer appliance when there is a potential problem with the subsystem and a core file needs to be generated. Further, one subsystem may be more complex (perhaps even less stable) and require more complex rules than another subsystem. Organizing the framework of rules into sets of rules for each subsystem allows each subsystem to specify its own rules for automatic core file generation.

Figure 16:
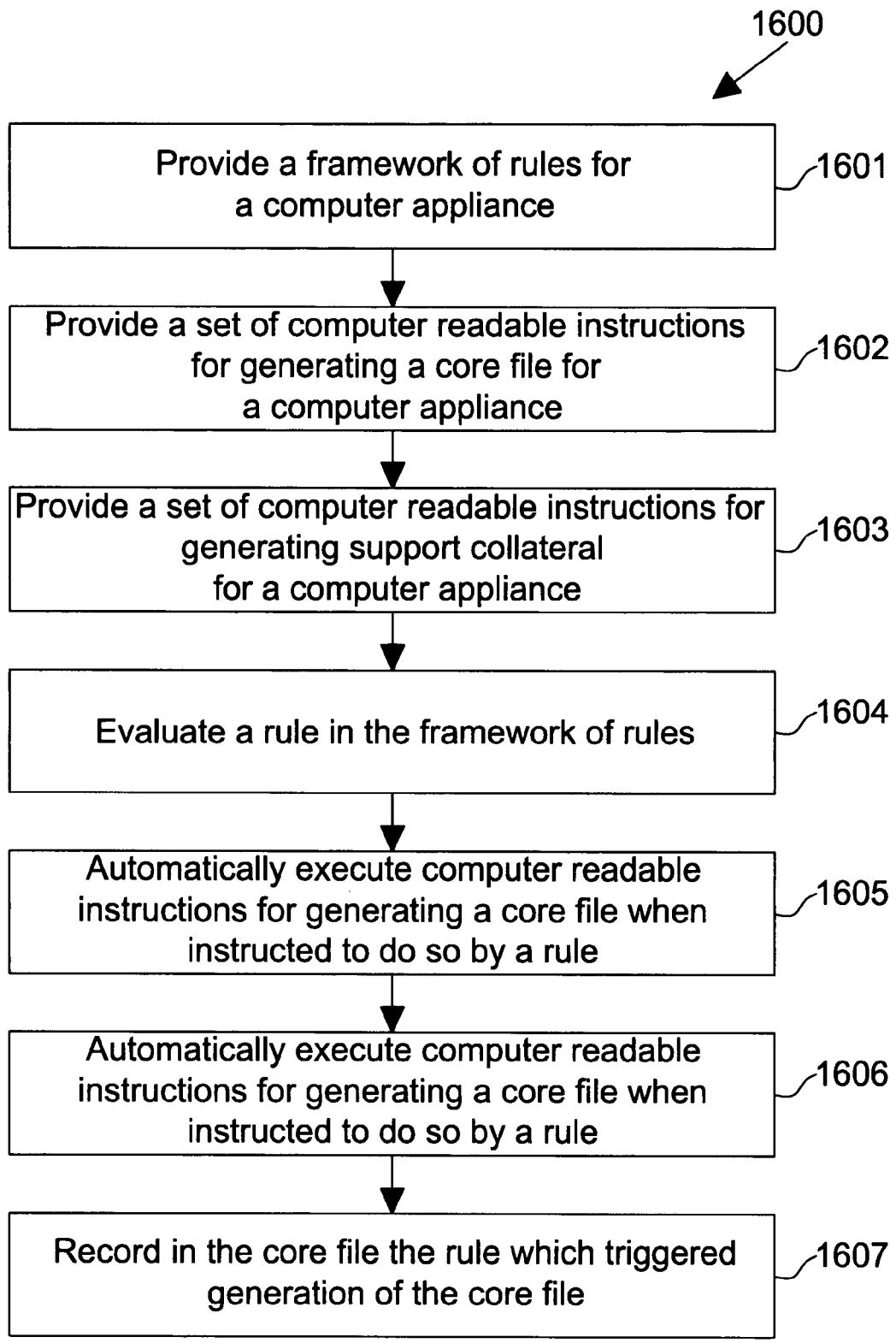
FIG. 16 is a flow chart illustrating a method for automatically generating a core file for a computer appliance, in accordance with an alternative embodiment of the present invention.

Referring to FIG. 16, a method of automatically generating a core file for a computer appliance, in accordance with an alternative embodiment of the present invention, is illustrated. In step 1601, a framework of rules for a computer appliance is provided. In step 1602, a set of computer readable instructions for generating a core file for a computer appliance are provided. In step 1603, a set of computer readable instructions for generating a support collateral for a computer appliance are provided. In step 1604, a rule in the framework of rules is evaluated. In step 1605, the set of computer readable instructions for generating a core file are automatically executed when a rule instructs to do so. In step 1606, the set of computer readable instructions for generating support collateral are automatically executed when the computer readable instructions for generating a core file are executed. In step 1607, the rule which triggered the generation of the core file is recorded in the core file.

The present invention allows continual assessment of a computer appliance to determine if individual subsystems are running in an impacted manner and automatic core file generation if one or more subsystems are running in an impacted manner. The present invention aids in pro-active diagnosis of potential problems with a computer appliance when the computer appliance as a whole may not be impacted or may not be impacted to the point of generating a panic core dump. Rule levels and inflection point levels allow rules of different levels of detail to be evaluated in order to provide fine control between diagnosis of potential problems and the normal function of the computer appliance. Further, by recording the rule that triggered the generation of the core file in the core file, key information is provided as to the potential problem with the computer appliance thus reducing the time required to diagnose.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A computer appliance, comprising:
    a processing unit;
    memory, coupled to the processing unit;
    a set of computer readable instructions for non-disruptively generating a core file, embodied in a tangible medium and executable by the processing unit;
    at least one cache buffer, and
    wherein the core file is a recording of the memory at a specific time and the set of instructions for non-disruptively generating a core file, when executed by the processing unit, writes the core file from the memory to a persistent storage device after the core file has been generated to the memory by treating the memory to which the core file has been generated as at least one dirty cache buffer and does not reboot the computer appliance.

2. The computer appliance as claimed in claim 1, wherein the core file is a synchronous core file.

3. The computer appliance as claimed in claim 1, wherein the core file is an asynchronous core file.

4. The computer appliance as claimed in claim 1, wherein the computer appliance is a storage caching device which copies contents of dirty buffers to a non volatile random access memory (RAM) and wherein the set of computer readable instructions for non-disruptively generating a core file, when executed by the processing unit, do not copy the contents of the memory to which the core file has been generated to the non volatile RAM.

5. The computer appliance as claimed in claim 1, wherein the set of computer readable instructions for non-disruptively generating a core file, when executed by the processing unit, generates the core file to at least one disk.

6. The computer appliance as claimed in claim 1, wherein the set of computer readable instructions for non-disruptively generating a core file, when executed by the processing unit, performs the steps of:
    analyzing a current state of the computer appliance;
    determining at least one procedure for generating a core file which, based on the current state of the computer appliance, will not disrupt the computer appliance;
    allocating resources for generation of the core file; and
    generating the core file without disrupting the computer appliance.

7. The computer appliance as claimed in claim 1, wherein the set of computer readable instructions for non-disruptively generating a core file, when executed by the processing unit, further perform the steps of:
    analyzing a memory;
    selecting at least one portion of the memory to generate the core file from; and
    selecting at least one portion of the memory not to generate the core file from.

8. A computer appliance, comprising:
    a processing unit;
    a memory, coupled to the processing unit; and
    a set of computer readable instructions for non-disruptively generating a core file while not rebooting the computer appliance, embodied in a tangible medium and executable by the processing unit, the core file being a recording of the memory at a specific time, wherein the set of computer readable instructions for non-disruptively generating a core file, when executed by the processing unit, further perform the steps of:
analyzing the core file;
determining at least one portion of the core file to be removed; and
removing the portion of the core file.

9. The computer appliance as claimed in claim 1, wherein the set of computer readable instructions for non-disruptively generating a core file, when executed by the processing unit, further perform the steps of:
compressing the core file.

10. A computer appliance, comprising:
a processing unit;
memory, coupled to the at least one processing unit; and
a set of computer readable instructions for non-disruptively generating a core
file while not rebooting the computer appliance, embodied in a tangible medium and executable by the processing unit, the core file being a recording of the memory at a specific time,
wherein the computer appliance has a maximum time in which the core file is generated without disrupting the computer appliance and the set of computer readable instructions for non-disruptively generating a core file, when executed by the at least one processing unit, further perform the steps of:
generating a set of at least one combination of at least one resource and at least one option for generating a core file;
estimating a time required for each combination;
eliminating any combination which has an estimated time which exceeds the maximum time of the computer appliance;
ranking the at least one combination in the set according to the estimated time of the combination; and
selecting the at least one combination from the set based upon the ranking.

11. The computer appliance as claimed in claim 10, wherein the step of ranking the at least one combination ranks the at least one combination first according to whether the combination generates a synchronous or asynchronous core file and then ranks the at least one combination according to the estimated time of the combination such that a combination which generates a synchronous core file would be selected before a combination which generates an asynchronous core file.

12. The computer appliance as claimed in claim 1, wherein the computer appliance is a caching device which includes at least one cache buffer and wherein the set of computer readable instructions for non-disruptively generating a core file, when executed by the processing unit, generates the core file to the at least one clean cache buffer.

13. The computer appliance as claimed in claim 12, wherein the set of computer readable instructions for non-disruptively generating a core file, when executed by the processing unit, write the core file from the at least one clean cache buffer to a persistent storage device after the core file has been generated to the at least one clean cache buffer.

14. A computer appliance, comprising:
a processing unit;
memory, coupled to the processing unit; and
a set of computer readable instructions for non-disruptively generating a core
file while not rebooting the computer appliance, embodied in a tangible medium and executable by the processing unit, the core file being a recording of the memory at a specific time, wherein the computer appliance is a caching device which includes at least one cache buffer and the set of computer readable instructions for non-disruptively generating a core file, when executed by the processing unit, generates the core file to at least one clean cache buffer; and writes the core file from the at least one cache buffer to a persistent storage device after the core file has been generated to the at least one cache buffer by marking the at least one cache buffer as a dirty cache buffer.

15. The computer appliance as claimed in claim 14, wherein the computer appliance is a storage caching device which copies the contents of dirty buffers to a non volatile random access memory (RAM) and wherein the set of computer readable instructions for non-disruptively generating a core file, when executed by the processing unit, do not copy the contents of the at least one cache buffer to the non volatile RAM.

16. A method for non-disruptively generating a core file, which is recording of the memory at a specific time, for a computer appliance without rebooting the computer appliance, comprising the steps of:
providing a set of computer readable instructions for non-disruptively generating a core file for a computer appliance without reboot;
executing the set of computer readable instructions for non-disruptively
generating a core file for a computer appliance without rebooting the computer
appliance, wherein the set of computer readable instructions for non-disruptively generating a core file for a computer appliance without rebooting the computer appliance, when executed:
generates the core file to the memory; and
writes the core file from the memory to a persistent storage device after the core file has been generated to the memory by treating the memory to which the core file has been generated as at least one dirty cache buffer.

17. The method as claimed in claim 16, wherein the core file is a synchronous core file.

18. The method as claimed in claim 16, wherein the core file is an asynchronous core file.

19. The method as claimed in claim 16, wherein the computer appliance is a storage caching device which copies the contents of dirty buffers to a non volatile random access memory (RAM) and wherein the set of computer readable instructions for non-disruptively generating a core file for a computer appliance without reboot, when executed, do not copy the contents of the memory to which the core file has been generated to the non volatile RAM.

* * * * *